(12) United States Patent
Pamplin et al.

(10) Patent No.: US 12,431,253 B2
(45) Date of Patent: Sep. 30, 2025

(54) FISSION PRODUCT EXTRACTION SYSTEM AND METHODS OF USE THEREOF

(71) Applicant: ABILENE CHRISTIAN UNIVERSITY, Abilene, TX (US)

(72) Inventors: Kim Pamplin, Abilene, TX (US); Diego Zometa, Abilene, TX (US)

(73) Assignee: Abilene Christian University, Abilene, TX (US)

( * ) Notice: Subject to any disclaimer, the term of this patent is extended or adjusted under 35 U.S.C. 154(b) by 0 days.

(21) Appl. No.: 18/663,976

(22) Filed: May 14, 2024

(65) Prior Publication Data

US 2024/0428961 A1    Dec. 26, 2024

Related U.S. Application Data

(60) Provisional application No. 63/509,491, filed on Jun. 21, 2023.

(51) Int. Cl.
| | |
|---|---|
| *G21C 19/30* | (2006.01) |
| *G21C 19/307* | (2006.01) |
| *G21G 1/00* | (2006.01) |

(52) U.S. Cl.
CPC ........... *G21C 19/307* (2013.01); *G21G 1/001* (2013.01); *G21C 19/30* (2013.01); *G21G 2001/0036* (2013.01)

(58) Field of Classification Search
CPC ..................................................... G21C 19/30

(Continued)

(56) References Cited

U.S. PATENT DOCUMENTS

| | | | | |
|---|---|---|---|---|
| 2,795,482 | A | * | 6/1957 | McNabney ............... C01G 5/02 423/491 |
| 3,105,028 | A | * | 9/1963 | Long ...................... G21C 19/30 376/310 |

(Continued)

FOREIGN PATENT DOCUMENTS

| | | |
|---|---|---|
| CA | 3179052 | 11/2021 |
| CA | 3085050 | 12/2021 |

(Continued)

OTHER PUBLICATIONS

H. Zhou, J. R. Long, O. M. Yaghi (2012). "Introduction to Metal-Organic Frameworks." Chemical Reviews. Chem. Rev. 2012, 112, 673-674.

(Continued)

*Primary Examiner* — Lily C Garner
(74) *Attorney, Agent, or Firm* — King & Spalding LLP

(57) ABSTRACT

A molten salt reactor system may produce fission products, such as molybdenum-99, which may be extracted by an extraction system. The extraction system may be configured to sparge the molten fuel salt with an inert gas to dislodge gaseous fission products from the molten fuel salt, so that the gaseous fission products flow through an off-gas outlet into a gas transfer assembly. The example extraction system may also include introducing a gaseous halogenating agent to prevent the fission products from depositing on a pipe surface of the gas transfer assembly. The gaseous fission products may flow from the gas transfer assembly to a carboy containing an aqueous solution, to process and/or filter the fission products. The resulting solution containing processed fission products in the carboy may be further distilled into final, usable products.

33 Claims, 13 Drawing Sheets

(58) Field of Classification Search
USPC .................................................. 376/308, 310
See application file for complete search history.

(56) References Cited

U.S. PATENT DOCUMENTS

| | | | |
|---|---|---|---|
| 3,730,833 | A | 5/1973 | Cremeans |
| 3,843,765 | A | 10/1974 | Anderson |
| 4,005,178 | A | 1/1977 | LeBlanc |
| 4,069,100 | A | 1/1978 | Cooper |
| 4,075,060 | A | 2/1978 | Colburn |
| 4,094,953 | A | 6/1978 | Hadi et al. |
| 6,186,159 | B1 | 2/2001 | DeGood |
| 7,011,736 | B1 | 3/2006 | Miller et al. |
| 7,914,600 | B2 | 3/2011 | Withers et al. |
| 7,960,581 | B2 | 6/2011 | Vreede et al. |
| 8,226,760 | B2 | 7/2012 | Collier et al. |
| 8,703,063 | B2 | 4/2014 | Hottovy |
| 8,767,905 | B2 | 7/2014 | Neeley et al. |
| 8,821,824 | B2 | 9/2014 | Ghirelli et al. |
| 9,228,579 | B2 | 1/2016 | Stobbe |
| 9,302,226 | B2 | 4/2016 | Loewen et al. |
| 9,376,639 | B2 | 6/2016 | Walter et al. |
| 9,847,149 | B2 | 12/2017 | Spoerke et al. |
| 9,875,818 | B2 | 1/2018 | Nygaard et al. |
| 10,056,160 | B2 | 8/2018 | LeBlanc |
| 10,176,901 | B2 | 1/2019 | Loewen |
| 10,388,419 | B2 | 8/2019 | Sakuma et al. |
| 10,416,045 | B2 | 9/2019 | Launiere et al. |
| 10,434,494 | B2 | 10/2019 | Kobayashi et al. |
| 10,566,101 | B2 | 2/2020 | Corpora |
| 10,636,532 | B2 | 4/2020 | Anderson et al. |
| 10,760,004 | B2 | 9/2020 | Garcia-Perez et al. |
| 11,031,140 | B2 | 6/2021 | Hunt et al. |
| 11,043,309 | B2 | 6/2021 | Nygaard et al. |
| 11,145,424 | B2 | 10/2021 | Abbott |
| 11,149,623 | B2 | 10/2021 | Kutsch |
| 11,257,600 | B2 | 2/2022 | Anderson et al. |
| 11,434,429 | B2 | 9/2022 | Goodrich et al. |
| 11,459,662 | B2 | 10/2022 | Murahara |
| 11,545,274 | B2 | 1/2023 | Bass et al. |
| 11,626,213 | B2 | 4/2023 | Regan et al. |
| 12,073,951 | B2 | 8/2024 | Regan |
| 2006/0023829 | A1* | 2/2006 | Schenter ............... G21G 1/001 376/190 |
| 2011/0045971 | A1 | 2/2011 | Collier |
| 2012/0302811 | A1 | 11/2012 | Long |
| 2014/0044624 | A1 | 2/2014 | Ghirelli |
| 2014/0226775 | A1 | 8/2014 | Volpi |
| 2016/0189806 | A1 | 6/2016 | Cheatham |
| 2016/0189816 | A1 | 6/2016 | Czerwinski |
| 2016/0196888 | A1 | 7/2016 | Spoerke |
| 2017/0084355 | A1 | 3/2017 | Scott |
| 2018/0030576 | A1 | 2/2018 | Urza |
| 2019/0057783 | A1 | 2/2019 | LeBlanc |
| 2019/0371482 | A1 | 12/2019 | Benson |
| 2020/0122109 | A1 | 4/2020 | Kruizenga |
| 2021/0313081 | A1 | 10/2021 | Nygaard et al. |
| 2022/0223302 | A1 | 7/2022 | De Groot |
| 2022/0310281 | A1 | 9/2022 | Czerwinski |
| 2023/0088516 | A1 | 3/2023 | Bailey |
| 2024/0017212 | A1 | 1/2024 | Miller |
| 2024/0062923 | A1 | 2/2024 | Scherr |
| 2024/0312656 | A1 | 9/2024 | Pamplin et al. |
| 2024/0347222 | A1 | 10/2024 | Czerwinski |

FOREIGN PATENT DOCUMENTS

| | | |
|---|---|---|
| CN | 101376528 | 3/2009 |
| CN | 101631642 | 1/2010 |
| CN | 203400551 | 1/2014 |
| CN | 109173419 | 1/2019 |
| CN | 108179432 | 9/2019 |
| CN | 110194494 | 9/2019 |
| CN | 109036610 | 3/2020 |
| CN | 109637682 | 9/2020 |
| CN | 113732294 | 12/2021 |
| CN | 113851246 | 12/2021 |
| CN | 113860350 | 12/2021 |
| CN | 112125281 | 2/2022 |
| CN | 112853100 | 7/2022 |
| CN | 111785407 | 8/2022 |
| CN | 112316724 | 11/2022 |
| CN | 112863725 | 12/2022 |
| CN | 112863726 | 12/2022 |
| EP | 0170033 | 5/1986 |
| EP | 4338174 | 3/2024 |
| GB | 829958 | 3/1960 |
| RU | 2499306 | 11/2013 |
| RU | 215749 | 12/2022 |
| WO | WO 2015017928 | 2/2015 |
| WO | WO 2015094450 | 10/2015 |
| WO | WO 2018/001469 | 1/2018 |
| WO | WO 2018026536 | 2/2018 |
| WO | WO 2018064572 | 4/2018 |
| WO | WO 2018213669 | 1/2019 |
| WO | WO 2019231971 | 1/2020 |
| WO | WO 2022146446 | 7/2022 |
| WO | WO-2024217652 A1 * | 10/2024 ............. G21C 19/30 |

OTHER PUBLICATIONS

Medha Kasula, Tin Le, Adrienne Thomsen, Milad Rabbani Esfahani (2022). "Silver metal organic frameworks and copper metal organic frameworks immobilized on graphene oxide for enhanced adsorption in water treatment." Chemical Engineering Journal, vol. 439, 2022, 135542, ISSN 1385-8947.

V. Sanderyd (2018). "Novel Hybrid Nanomaterials—Combining Mesoporous Magnesium Carbonate and Metal-Organic Frameworks." Uppsala Universitet.

Osama Abuzalat et al. (2018). Sonochemical fabrication of Cu(II) and Zn(II) metal-organic framework films on metal substrates, *Ultrasonics Sonochemistry*, vol. 45, 2018, pp. 180-188, ISSN 1350-4177.

Mahboobeh Tanhaei, et al., (2019), Energy-efficient sonochemical approach for the preparation of nanohybrid composites from graphene oxide and metal-organic framework, Inorganic Chemistry Communications, vol. 102, 2019, pp. 185-191, ISSN 1387-7003.

U.S. Appl. No. 18/783,094, filed Jul. 24, 2024, Pamplin et al., Jan. 30, 2025, US20250037889.

U.S. Appl. No. 18/771,047, filed Jul. 24, 2024, Pamplin et al., Apr. 3, 2025, US20250109035.

U.S. Appl. No. 18/899,211, filed Sep. 27, 2024, Pamplin et al., Apr. 3, 2025, US20250111957.

McDonald. "Challenges of Extracting and Purifying Fission-Produced Molybdenum-99" 3146-3150. Industrial & Engineering Chemistry Research. Jul. 29, 2000.

Rao. "Studies on separation and purification of fission 99Mo from neutron activated uranium aluminum alloy" 186-191. Applied Radiation and Isotopes. Jul. 2014; <abstract; p. 187, col. 2, last paragraph; p. 188.

Cheng et al. Molten salt-assisted carbonized zeolite imidazolate framework on nickel foam for highly efficient iodide capture in fluoride molten salts (2023), Chemical Engineering Journal 477, (2023).

Hoyt, N. et al. "Online Monitoring of Molten Salt Reactors," Argonne National Laboratory (2019).

International Search Report and Written Opinion for PCT/US2024/032187, issued Sep. 10, 2024.

Furuichi et al. "Study on behavior of tritium in concrete wall," Journal of nuclear materials 350.3 (2006): 246-253.

* cited by examiner

FISSION PRODUCT EXTRACTION SYSTEM AND METHODS OF USE THEREOF

RELATED APPLICATION

The present application relates and claims priority to U.S. Provisional Application No. 63/509,491, filed on Jun. 21, 2023, which is hereby incorporated by reference in its entirety.

TECHNICAL FIELD

The present disclosure relates generally to systems and methods for extraction of fission products, including molybdenum-99, from irradiated fueled molten salt compositions of a molten salt reactor, for example, for the extraction of gaseous fission product complexes dissolved in irradiated fueled molten salt of a molten salt reactor system.

BACKGROUND

Molten salt reactors (MSRs) offer an approach to nuclear power that utilizes molten salts as their nuclear fuel in place of the conventional solid fuels used in light water reactors. Advantages include efficient fuel utilization and enhanced safety (largely due to replacing water as a coolant with molten salt). In an MSR, fission reactions occur within a molten salt composition housed within a reactor vessel. The fission of uranium-235 (U-235) produces a spectrum of fission products, including, but not limited to molybdenum-99 (Mo-99), actinium-225, iodine-131 (I-131) and xenon-133 (Xe-133). The decay product of Mo-99, technetium-99m (Tc-99m), is used in at least two-thirds of all diagnostic medical isotope procedures. Tc-99m is used for detection of disease and for the study of organ structure and function. Tc-99m has a half-life of about 6 hours and emits 140 keV photons when it decays to Tc-99, a radioactive isotope with an approximately 214,000-year half-life. This photon energy is useful for detection by scintillation instruments such as gamma cameras, and the data collected by the cameras are analyzed to produce structural and functional images. Nuclear reactors provide an efficient source of thermal neutrons for Mo-99 production. Given the short half-life of Tc-99m, it is advantageous to collected Mo-99 from nuclear reactors.

A molten salt reactor (MSR) is a class of nuclear fission reactors that contain either a liquid salt coolant, a liquid salt coolant-fuel mixture, or a two-fluid blanket and fuel arrangement. The liquid (or molten) salts must be able to dissolve the fuel and blanket and allow for easy chemical separation of fission products after irradiation. They must also be chosen to maximize performance and safety. Typical salts can be made of fluorine, chlorine, lithium, sodium, potassium, beryllium, rubidium, and zirconium compounds. Fluoride-based salts are a typical choice for thermal spectrum reactor designs, as they absorb fewer neutrons and are better moderators than other halides. Following nuclear fission, the Mo-99 atoms and other fission products are present in the irradiated molten fuel salt. As such, there remains a need for an improved system and method to extract and process the Mo-99 and other fission products from the irradiated molten fuel salt.

SUMMARY OF THE INVENTION

In one example, a fission product extraction system is disclosed. The example system may include a vessel fluidly connected to a molten salt loop of a molten salt reactor system; the vessel may be configured to receive a flow of fueled molten salt comprising dissolved fission products from the molten salt loop. The system may also include an extraction assembly fluidly coupled to the vessel and include a first gas conduit configured to introduce inert gas into the vessel and dislodge the dissolved fission products from the fueled molten salt. The extraction system may also include a gas transfer assembly configured to receive the dislodged fission products from the vessel. The extraction system may also include a second gas conduit fluidly connected to the gas transfer assembly and configured to feed a gas into the gas transfer assembly and move the dislodged fission products therethrough. The extraction system may also include a carboy fluidly connected to the gas transfer assembly and configured to receive the dislodged fission products and dissolve the dislodged fission products into a liquid solution contained within the carboy.

The fission product extraction system may further include a purification system. The purification system may include an extraction cartridge configured to receive the liquid solution containing the dissolved fission products from the carboy. The extraction cartridge may be operable to absorb fission products from the liquid solution, fission products may be retained in a sorbent of the extraction cartridge as the dissolved fission products in the liquid solution from the carboy are passed through the extraction cartridge and the retained fission products may be eluted from the sorbent into a generator configured to store the fission products.

The extraction cartridge may be operable to selectively isolate fission products from one another by configuring the sorbent to absorb the selected fission products and elute other fission products of the fission products.

The extraction cartridge and/or the carboy may be removable while containing the dislodged fission products from the fission product extraction system for offsite processing.

The extraction cartridge may be configured to be fluidly connected to the generator and a waste container, wherein the extraction system includes piping and at least one valve to selectively direct fission products from the extraction cartridge to the generator or the waste container.

The first gas conduit may include a porous tube extending into an internal volume of the vessel and configured to feed the inert gas into the vessel through a plurality of pores of the porous tube.

The first gas conduit may be configured to feed the inert gas about an internal periphery of the vessel.

The first gas conduit may include a porous toroidal tube positioned at a lower section of the vessel and configured to feed the inert gas into the vessel through a plurality of pores of the porous toroidal tub.

The first gas conduit may include a support rod vertically extending from a bottom side of the vessel into an internal volume of the vessel, the support rod may include at least one horizontally extending porous blade configured to feed the inert gas into the vessel through a plurality of pores of the at least one porous blade as the at least one porous blade spins about the support rod.

The extraction cartridge may be a Solid Phase Extraction (SPE) cartridge including at least one alumina sorbent.

The fission products may be dislodged from the fueled molten salt in a gaseous phase by diffusion through agitation caused by the inert gas contacting the fueled molten salt. The gas transfer assembly may include a gas outlet positioned on a top side of the vessel. The gaseous phase fission products may ascend into the gas outlet upon dislodgment.

The second gas conduit may be configured to feed the gas throughout piping of the gas transfer assembly and the second gas conduit may be configured to feed the gas in the direction of the carboy to facilitate receipt of the dislodged fission products by the carboy.

The gas may include a halogenating agent operable to react with precipitated fission products deposited on piping of the transfer assembly.

The gas transfer assembly may include at least one heat wrap configured to heat a surface of piping of the gas transfer assembly.

The dissolved fission products may include molybdenum. The inert gas may include helium gas. The halogenating agent may include nitrogen trifluoride.

In another example, the system includes a fuel salt system configured to circulate an irradiated fueled molten salt comprising dissolved fission products through a molten salt loop of a molten salt reactor system including an access vessel, a reactor, and a heat exchanger. The system may further include an extraction system fluidly coupled to the access vessel along the molten salt loop. The extraction system may include the access vessel fluidly connected to the molten salt loop of the molten salt reactor system and may be configured to receive a flow of irradiated fueled molten salt from the reactor of molten salt reactor system following nuclear fission. The extraction system may include a first gas conduit fluidly connected to the access vessel and configured to sparge the dissolved fission products from the irradiated fueled molten salt. The extraction system may further include a gas transfer assembly fluidly connected to the access vessel and configured to direct the sparged fission products to a carboy.

The carboy may be configured to receive the sparged fission products and dissolve the sparged fission products into a liquid solution contained within the carboy.

The system may further include a purification system. In one example, the purification system includes a Solid Phase Extraction (SPE) cartridge configured to receive the dissolved fission products from the carboy. The SPE cartridge may be operable to absorb fission products from the liquid solution. The fission products may be retained in a sorbent of the SPE cartridge as the dissolved fission products in the liquid solution from the carboy are passed through the SPE cartridge. The retained fission products may be eluted from the sorbent into a generator configured to store the concentrated fission products.

The SPE cartridge may receive the dissolved fission products from the carboy by a continuous flow or by batch.

The system may further include a reactor pump fluidly coupled to the access vessel operable to facilitate circulation of the irradiated fueled molten salt to the access vessel.

The heat exchanger may be downstream of the reactor pump, and the reactor pump may be downstream of the fission product extraction system and the access vessel.

In another example, a method for extraction of fission products from irradiated fueled molten salt of a molten salt reactor system is disclosed. In one example the method includes sparging a reactor access vessel that is fluidly connected to a molten salt loop of the molten salt reactor system with an inert gas. Then, dislodging dissolved fission products from the irradiated fueled molten salt by agitation of the irradiated fueled molten salt by the inert gas. Then, receiving the dislodged fission products from the irradiated fueled molten salt by a gas transfer assembly fluidly connected to the reactor access vessel. Then, feeding a gas into the gas transfer assembly as the gas transfer assembly receives the dislodged fission products. Finally, dissolving the dislodged fission products into a liquid solution in a carboy fluidly connected to the gas transfer assembly.

The method may further include purifying the dissolved fission products by providing an extraction cartridge configured to receive and absorb the dissolved fission products from the liquid solution of the carboy, isolating selected fission products by washing a sorbent of the extraction cartridge, and eluting the selected fission products from the sorbent into a generator.

The method may further include concentrating the selected fission products by continually passing the liquid solution of the carboy through the extraction cartridge.

In this example method, the fission products may include molybdenum.

The method may further include circulating the irradiated fueled molten salt through a reactor of the molten salt reactor system causing fission reactions.

The method may further include circulating the irradiated fueled molten salt through a heat exchanger following removal of the dissolved fission products.

In this example method, the inert gas may include helium gas and the gas may include nitrogen trifluoride.

In another example, a fission product extraction system is disclosed. In one example, the fission product extraction system includes a vessel fluidly connected to a molten salt loop of a molten salt reactor system, wherein the vessel is configured to receive a flow of fueled molten salt comprising dissolved fission products from the molten salt loop. This example system may include an extraction assembly fluidly coupled to the vessel, which may include a bypass configured to isolate the vessel from the molten salt loop and a valve positioned on a top side of the vessel fluidly connecting a gas transfer assembly to the vessel and configured to decrease a pressure of the vessel upon opening of the valve. Upon the pressure of the vessel decreasing, the fueled molten salt may be degassed, and the dissolved fission products are dislodged from the fueled molten salt. The gas transfer assembly may be configured to receive the dislodged fission products from the vessel. This example system may include a gas conduit fluidly connected to the gas transfer assembly and configured to feed a gas into the gas transfer assembly and move the dislodged fission products therethrough. This example system may further include a carboy fluidly connected to the gas transfer assembly and configured to receive the dislodged fission products and dissolve the dislodged fission products into a liquid solution contained within the carboy.

In this example system, the pressure of the vessel may decrease upon the opening of the valve, thereby by fluidly connecting a volume of the gas transfer assembly to a volume of the vessel and causing the volume of the vessel to increase.

This example system may further include a purification system. In one example the purification system includes an extraction cartridge configured to receive the liquid solution containing the dissolved fission products from the carboy. The extraction cartridge may be operable to absorb fission products from the liquid solution. The fission products may be retained in a sorbent of the extraction cartridge as the dissolved fission products in the liquid solution from the carboy are passed through the extraction cartridge. The retained fission products may be eluted from the sorbent into a generator configured to store the fission products.

In this example system, the bypass may include piping configured to divert the flow of fueled molten salt, such that the flow of fueled molten salt continues throughout the molten salt loop upon isolation of the vessel.

In this example system, the bypass may include at least one bypass valve configured to selectively isolate the vessel from the molten salt loop.

In this example system, the fission products may be dislodged from the fueled molten salt in a gaseous phase by a reduction of a partial pressure of a volume above the fueled molten salt within the vessel.

In this example system, the gas transfer assembly may include a gas outlet positioned on a top side of the vessel, and the gaseous phase fission products may ascend into the gas outlet upon dislodgment.

In this example system, the gas conduit may be configured to feed the gas throughout piping of the gas transfer assembly and the gas conduit may be configured to feed the gas in the direction of the carboy to facilitate receipt of the dislodged fission products by the carboy.

In the example purification system, the extraction cartridge may be operable to selectively isolate specific fission products from others by configuring the sorbent to absorb the selected fission products and elute other fission products.

In the example purification system, the extraction cartridge may be a Solid Phase Extraction (SPE) cartridge packed with at least one alumina sorbent.

In the example extraction system, the dissolved fission products may comprise molybdenum, the inert gas may comprise helium gas, and the gas may comprise nitrogen trifluoride.

In yet another example, a method for extracting fission products from irradiated fueled molten salt of a molten salt reactor system is disclosed. In one example, the method includes circulating a flow of irradiated fueled molten salt to a reactor access vessel that is fluidly connected to a molten salt loop of the molten salt reactor system. Then, isolating the reactor access vessel from the molten salt loop. Then, dislodging dissolved fission products from the irradiated fueled molten salt by decreasing a pressure of the access vessel by opening of a valve to a gas transfer assembly. Then, receiving the dislodged fission products from the irradiated fueled molten salt by the gas transfer assembly fluidly connected to the reactor access vessel. Then, feeding a gas into the gas transfer assembly as the gas transfer assembly receives the dislodged fission products. Finally, dissolving the dislodged fission products into a liquid solution in a carboy fluidly connected to the gas transfer assembly.

In this example, the method may further include purifying the dissolved fission products by providing an extraction cartridge configured to receive and absorb the dissolved fission products from the liquid solution of the carboy. Then, isolating selected fission products by washing a sorbent of the extraction cartridge. Finally, eluting the concentrated fission products from the sorbent into a generator.

In this example, the method may further include diverting the flow of irradiated fueled molten salt by a bypass fluidly connected to the reactor access vessel and molten salt loop.

In this example, the method may further include selectively isolating the reactor access vessel from the flow of irradiated fueled molten salt by at least one bypass valve of the bypass.

In this example, the dissolved fission products may be dislodged from the fueled molten salt in a gaseous phase by a reduction of a partial pressure of a volume above the irradiated fueled molten salt within the access vessel. The gas transfer assembly may include a gas outlet positioned on a top side of the vessel, and the gaseous phase fission products may ascend into the gas outlet upon dislodgement.

In this example, the pressure of the vessel may decrease upon opening of the valve, thereby fluidly connecting a volume of the gas transfer assembly to a volume of the vessel and causing the volume of the vessel to increase.

In this example, the method may further include removing the carboy from the gas transfer assembly.

In this example, the method may further include circulating the irradiated fueled molten salt through a reactor of the molten salt reactor system causing fission reactions.

In this example, the method may further include circulating the irradiated fueled molten salt through a heat exchanger following removal of the dissolved fission products.

In this example, the dissolved fission products may comprise molybdenum, and the gas may comprise nitrogen trifluoride.

In a first aspect, a fission product extraction system including: an inert gas feed connected to a vessel of a molten salt reactor system, wherein the vessel contains molten salt containing a plurality of fission products, and wherein the inert gas feed sparges the molten salt with inert gas; a fission product outlet connected to the vessel; a halogenating gas feed connected to the fission product outlet; and a carboy connected to the fission product outlet, wherein the carboy contains a basic solution; wherein the plurality of fission products reacts with the basic solution to form a processed fission product solution.

In a second aspect, the system of the first aspect or any other aspect, wherein the inert gas dislodges the plurality of fission products from the molten salt which causes the plurality of fission products to flow through the fission product outlet.

In a third aspect, the system of the second aspect or any other aspect, wherein the halogenating gas feed prevents the plurality of fission products from precipitating onto the fission product outlet.

In a fourth aspect, the system of the first aspect or any other aspect, further including an extraction cartridge; and a generator; wherein the processed fission product solution is flowed through the extraction cartridge to adsorb at least one species of the plurality of fission products, and wherein the at least one adsorbed fission product species is eluted from the extraction cartridge into the generator for storage.

In a fifth aspect, the system of the first aspect or any other aspect, wherein the plurality of fission products includes one or more of molybdenum-99, actinium-225, iodine-131, xenon-133, hydrogen-3, nitrogen-13, carbon-14, oxygen-15, fluorine-18, gallium-67, gallium-68, selenium-75, krypton-81m, strontium-89, yttrium-90, technetium-99m, indium-111, iodine-123, iodine-125, samarium-153, erbium-169, and radium-223.

In a sixth aspect, the system of the first aspect or any other aspect, wherein the halogenating gas includes at least one of nitrogen trifluoride and fluorine gas.

In a seventh aspect, a method including creating a plurality of fission products within a molten salt reactor system, wherein the plurality of fission products are in a gaseous state within molten salt flowing through the molten salt reactor system; sparging inert gas into the molten salt; dislodging the plurality of gaseous fission products from the molten salt; receiving the plurality of gaseous fission products at a gas outlet opening; mixing the plurality of gaseous fission products with a halogenating gas in the gas outlet; mixing the plurality of gaseous fission products in a basic solution in a carboy to form a processed fission product solution; and purifying the processed fission product solution.

In an eighth aspect, the method of the seventh aspect or any other aspect, wherein purifying the processed fission product solution further includes: flowing the processed fission product solution through an extraction cartridge, wherein at least one species of fission product of the plurality of fission products is adsorbed by material in the extraction cartridge; eluting the at least one species of fission product from the material in the extraction cartridge to a generator; and storing the at least one species of fission product in the generator.

In a ninth aspect, the method of the eighth aspect or any other aspect, wherein the at least one species of fission products includes at least one of molybdenum-99, actinium-225, iodine-131, xenon-133, hydrogen-3, nitrogen-13, carbon-14, oxygen-15, fluorine-18, gallium-67, gallium-68, selenium-75, krypton-81m, strontium-89, yttrium-90, technetium-99m, indium-111, iodine-123, iodine-125, samarium-153, erbium-169, and radium-223.

In a tenth aspect, the method of the seventh aspect or any other aspect, wherein the halogenating gas includes at least one of nitrogen trifluoride and fluorine gas.

In addition to the example aspects described above, further aspects and examples will become apparent by reference to the drawings and by study of the following description.

Figure 1:
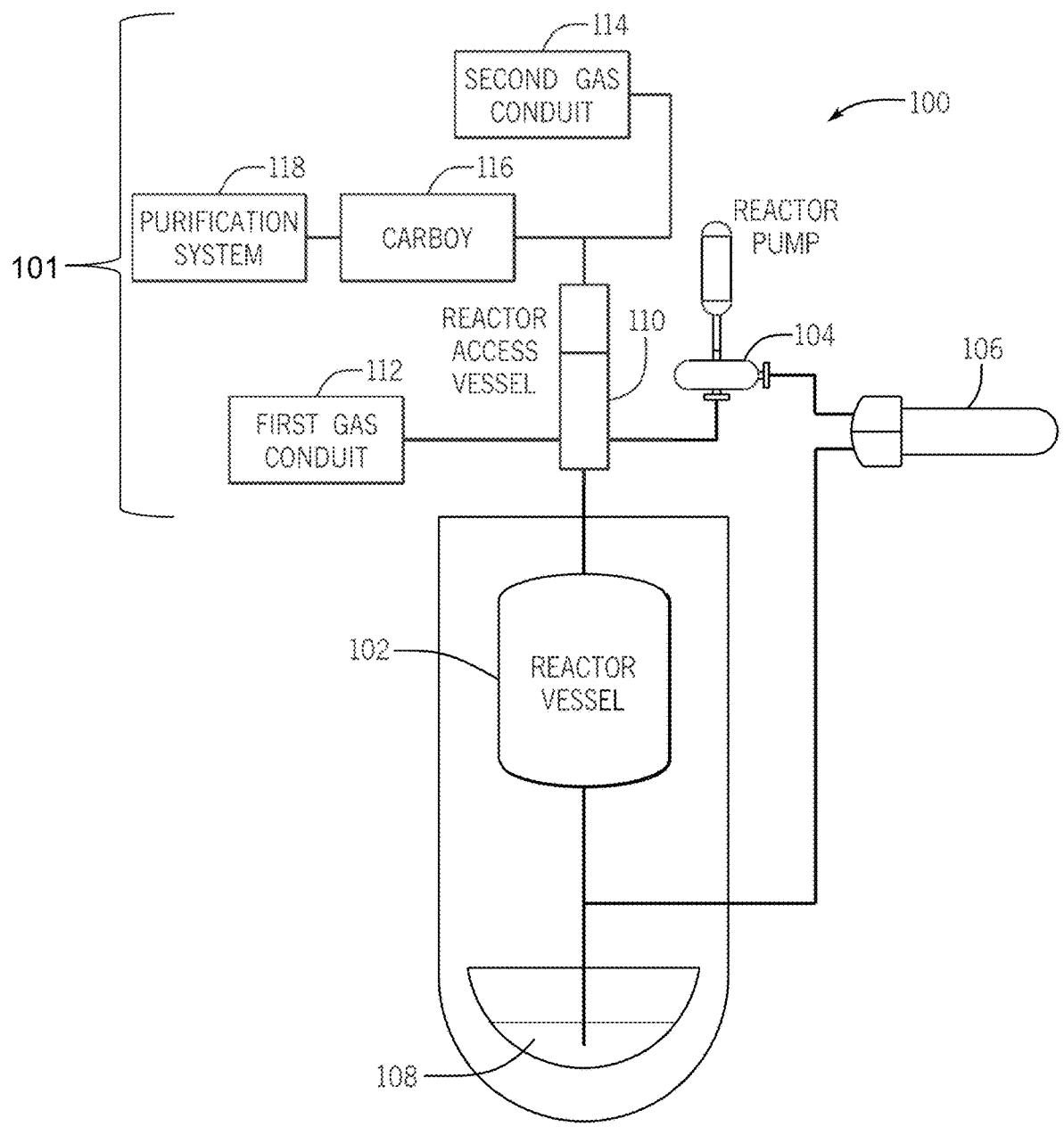
FIG. 1 illustrates a schematic representation of an example molten salt reactor system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DESCRIPTION OF THE INVENTION

The description that follows includes example systems, methods, and apparatuses that embody various elements of the present disclosure. However, it should be understood that the described disclosure may be practiced in a variety of forms in addition to those described herein.

Systems and methods for the extraction of fission products from irradiated fueled molten salt compositions are disclosed herein. Uranium atoms, e.g., U-235, in the fueled molten salt composition may undergo fission in the reactor core of a molten salt reactor (MSR) to yield fission products which may be present in the irradiated fueled molten salt composition. Such fission products may include isotopes, such as molybdenum-99 (Mo-99), actinium-225 (Ac-225), iodine-131 (I-131) and xenon-133 (Xe-133), among many other such isotopes. Other isotopes within the molten salt reactor are created by neutron bombardment, and still other isotopes within the molten salt reactor are created by decay. These isotopes (isotopes created directly by fission, by neutron bombardment, or by decay) are collectively referred to herein as fission products or fission fragments. The fueled molten salt containing these fission products may be carried through the MSR system by a molten salt loop, conduit, or series of tubing or piping connecting the components of the MSR system together (e.g., reactor vessel, heat exchanger, reactor access vessel, fuel pump, drain tank, etc.). It is advantageous to remove these fission products from the fueled molten salt for a variety of reasons.

One reason for removing fission products from the molten salt is to avoid the continual buildup of fission products, which may cause damage to the reactor of the MSR or inhibit the fission rate of the MSR system. Conventional molten salt reactors allow for the buildup of fission products in the molten fuel salt until the molten fuel salt is removed from the molten salt reactor system. The buildup of fission products in the molten fuel salt can cause the fission rate of the molten fuel salt to decline at a faster rate, necessitating an earlier removal of the molten fuel salt and hindering the efficiency of the conventional molten salt reactor system.

Another reason for removing fission products from the molten salt is for the collection of valuable fission products. For example, molybdenum-99 (often referred to as Mo-99) is a unique isotope of molybdenum that gives birth to technetium-99m (Tc-99m) through beta decay. Tc-99m is used in tens of millions of medical diagnostic procedures annually. Conventional MSR systems that allow for the buildup of fission products in the fueled molten salt until the molten salt is removed from the MSR system are inefficient for several reasons, such as requiring a shut down or slowdown of nuclear fission and the loss of fission products during extraction.

Fission products may be present in the molten salt in a gaseous phase. These gaseous fission products may be found dissolved in the molten salt following nuclear fission within the reactor of the MSR. For example, fission may produce molybdenum-99 cations, which may react with fluorine anions in the molten salt to produce molybdenum hexafluoride ($MoF_6$). Other examples include technetium hexafluoride ($TcF_6$), iodine pentafluoride ($IF_5$), antimony pentafluoride ($SbF_5$), among others. $MoF_6$ has a boiling point of about 34° C., so it will be in a gaseous phase within the molten salt loop (having an operating temperature between 600° C. and 700° C.). However, given the pressure within the molten salt loop, the $MoF_6$ (and other gaseous fission products) is likely to be found dissolved in the molten salt. Nonetheless, gaseous fission products contribute to the buildup of fission products within the MSR system, produce the consequential negative effects, and are worthy of extraction for their independent value.

The molten salt reactor systems of the present disclosure include an extraction system to extract and process the fission products from the fueled molten salt while the molten salt reactor system is at full power, such that any fission product buildup issues are lessened or eliminated. Specifically, the fission product extraction system of the present invention includes an extraction assembly coupled to a vessel of the molten salt reactor system designed to capture gaseous fission products by dislodging them from the molten salt. The extraction assembly may generally include a sparging apparatus or diffuser, a gas transfer assembly, and a purification system. The various extraction assemblies disclosed herein may be fluidly connected to vessel of the MSR system, such as an access vessel, glovebox, or hot cell. The extraction assemblies may include a first gas conduit connected to the vessel configured in a manner to sparge the molten fuel salt with an inert gas (such as, but not limited to, helium gas, nitrogen gas, or argon gas) to dislodge gaseous fission products from the molten fuel salt. For clarity, as used herein the fission product extraction system refers to a holistic system for extraction fission products while the extraction assembly refers to the apparatus and systems fluidly connected to the vessel operable to dislodge, capture, and purify fission products. The extraction assembly may sometimes be referred to as the extraction system. The vessel may be fluidly connected to a gas transfer assembly connected to a top side of the access vessel by an outlet connecting an internal volume of the access vessel to an internal volume of the gas transfer assembly, so that the gaseous fission products flow through an off-gas outlet into the gas transfer assembly upon dislodgement. The gas transfer assembly may be further fluidly connected to a carboy and include a second gas conduit to facilitate deposition of the dislodged gaseous fission products into a solution of the carboy, where they are redissolved for purification. Additionally, the second gas conduit may be configured to feed a gas through the gas transfer assembly to direct the dislodged fission products towards the carboy. The gas transfer assembly may be equipped with means to discourage or prevent deposition of dislodged fission products onto the piping of the gas transfer assembly, such as piping heaters or inclusion of a halogenating agent in the gas of the second gas conduit. Finally, the gas transfer assembly may be fluidly connected to and facilitate transfer of the dislodged fission products to a purification system, where certain fission products may be isolated from others. Thus, the present invention may be operable to reduce or eliminate fission product build up and may facilitate capture of valuable isotopes produced by nuclear fission.

The various extraction systems disclosed herein may also be configured to dislodge gaseous fission products from the fueled molten salt without the need for a sparging apparatus. This example extraction system dislodges gaseous fission products by isolating the access vessel from the molten salt loop and releasing the pressure therein. This may create a vacuum that dislodges the dissolved gaseous fission products out of the molten salt. Effectively, by releasing the pressure (i.e., decreasing the pressure) within the access vessel containing the molten salt (and the dissolved fission products) the gaseous fission products may be more environmentally stable outside the molten salt than dissolved therein due to the change in partial pressure. The system may be further configured to direct the dislodged gaseous fission products to a carboy for capture and subsequent purification by a gas transfer assembly.

The gas transfer assembly may include a second gas conduit configured for introducing a gas to facilitate transfer of the dislodged fission products. The gas of the second gas conduit may include a halogenating agent (such as, but not limited to, fluorine gas ($F_2$), hydrogen fluoride gas (HF), chlorine gas ($Cl_2$), hydrogen chloride (HCl), nitrogen trifluoride ($NF_3$)). The halogenating agent may be included such that gaseous fission products are dissuaded or prevented from depositing onto the piping of the gas transfer assembly, thus increasing the efficacy of the system. In some embodiments, gas of the second gas conduit includes a mixture of gases, for example, a mixture of $NF_3$ in argon gas. The second gas conduit may be configured to feed gas into piping of the gas transfer assembly connecting the off-gas outlet to the carboy and in the direction of the carboy to force the gaseous fission products to the carboy. The second gas conduit may also be configured to feed gas throughout the piping of the gas transfer assembly through a plurality of pores on said piping. In another embodiment, the gas transfer assembly may be heated using a heating system comprising external heaters, heat wraps, or other heating systems and methods, such that the pipe surface of the gas transfer assembly is at a temperature sufficient to prevent or dissuade the gaseous fission products from depositing on the pipe surface.

Thereafter, the gaseous fission products may flow to an isolation or purification system. The gas transfer assembly may be configured to facilitate flow of the dislodged fission products to a carboy containing liquid solution, where the fission products are dissolved into the liquid solution. The solution contained within the carboy may be an alkaline solution, for example, an aqueous solution containing sodium hydroxide. The fission products may react with the alkaline solution of the carboy, such that the fission products are dissolved therein. For example, the molybdenum hexafluoride may react with the sodium hydroxide and water to produce sodium molybdate ($Na_2MoO_4$). The resulting solution (containing, for example, sodium molybdate) may then be passed through an extraction column, for example, a Solid Phase Extraction (SPE) cartridge. Thereafter, various elution processes may be used to isolate the molybdate from the remaining fission products captured by the extraction assembly. For example, the extraction cartridge may include a sorbent configured to absorbed molybdate and elute other saline fission fragments that are deposited within the carboy. The extraction cartridge may then become more and more concentrated with molybdate as the alkaline solution from the carboy is passed through the extraction cartridge. Effectively, the extraction cartridge may be operable to isolate the molybdate from the remaining fission products. The concentrated molybdate of the sorbent may be eluted to a generator and further processed into final, usable products. Other fission products may be purified in a substantially similar way, such as complexes of iodine-123, 125, 131, strontium-89, 90, or xenon-133. In at least one embodiment, the resulting solution in the carboy may undergo a one-step purification process to produce the final product, or may undergo a two-step purification process.

Turning to the drawings, for purposes of illustration, FIG. 1 depicts a schematic representation of an example molten salt reactor system 100. The molten salt reactor system 100 may implement and include the fission product extraction system and implement any of the functionalities of each described herein. As will be understood and appreciated, the example shown in FIG. 1 represents merely one example configuration of a molten salt reactor system 100 in which such extraction systems may be utilized. It will be understood that the extraction systems described herein may be used in and with substantially any other configuration of the molten salt reactor, as contemplated herein.

In various embodiments, a molten salt reactor system 100 utilizes fuel salt enriched with uranium (e.g., high-assay low-enriched uranium) to create thermal power via nuclear fission reactions. The uranium in the molten salt may be uranium-235 or uranium-233. In another embodiment, the molten salt reactor 100 may be a breeder reactor that utilizes thorium-232 as a starting material, in which the thorium-232 undergoes transmutation into uranium-233, which undergoes the nuclear fission reactions. In at least one embodiment, the composition of the fuel salt may be LiF—$BeF_2$—$UF_4$, though other compositions of fuel salts may be utilized as fuel salts within the reactor system 100. The fuel salt within the system 100 is heated to high temperatures (about 700° C.) and melts as the system 100 is heated, such that the fuel ($UF_4$) is dissolved in the molten salt. In several embodiments, the molten salt reactor system 100 includes a reactor vessel 102 where the nuclear fission reactions occur within the molten fuel salt, a fuel salt pump 104 that pumps the molten fuel salt to a heat exchanger 106, such that the molten fuel salt re-enters the reactor vessel 102 after flowing through the heat exchanger 106, and piping in between each component. The molten salt reactor system 100 may also include additional components, such as, but not limited to, a drain tank 108, a heat exchanger 106, a reactor pump 104, and a reactor access vessel 110. The drain tank 108 may be configured to store the fuel salt once the fuel salt is in the reactor system 100 but in a subcritical state, and also acts as storage for the fuel salt if power is lost in the system 100. The reactor access vessel 110 may be configured to allow for introduction of small pellets of uranium fluoride ($UF_4$) and/or beryllium (Be) to the system 100 as necessary, in which the pellets dissolve within the molten salt and bring the reactor to a critical state, compensate for depletion of fissile material, and/or manage fuel salt chemistry.

Additionally, the molten salt reactor system 100 may include or be fluidly connected to a fission product extraction system 101 including a purification system 118, a first gas conduit 112, a second gas conduit 114, and a carboy 116. The fission product extraction system 101 may comprise an extraction assembly configured to be integrated into a molten salt reactor system 100 to extract fission products found therein. The extraction assembly may include a purification system 118, a first gas conduit 112, a second gas conduit 114, and a carboy 116. The first gas conduit 112, may be the sparging apparatus and be generally operable to sparge the contents of the reactor access vessel 110 with an inert gas. The second gas conduit 114 may be generally operable to facilitate transfer of the dislodged or sparged fission products to the carboy 116. The carboy 116 may be generally operable to receive the dislodged fission products and dissolved them within a liquid solution contained within a volume of the carboy 116. The carboy 116 may be fluidly connected to a purification system 118. The purification system 118 may be generally operable to purify the solution of the carboy 116 following fission product capture. The purification system 118 may facilitate isolation of specific fission products captured by the extraction system.

Figure 2:
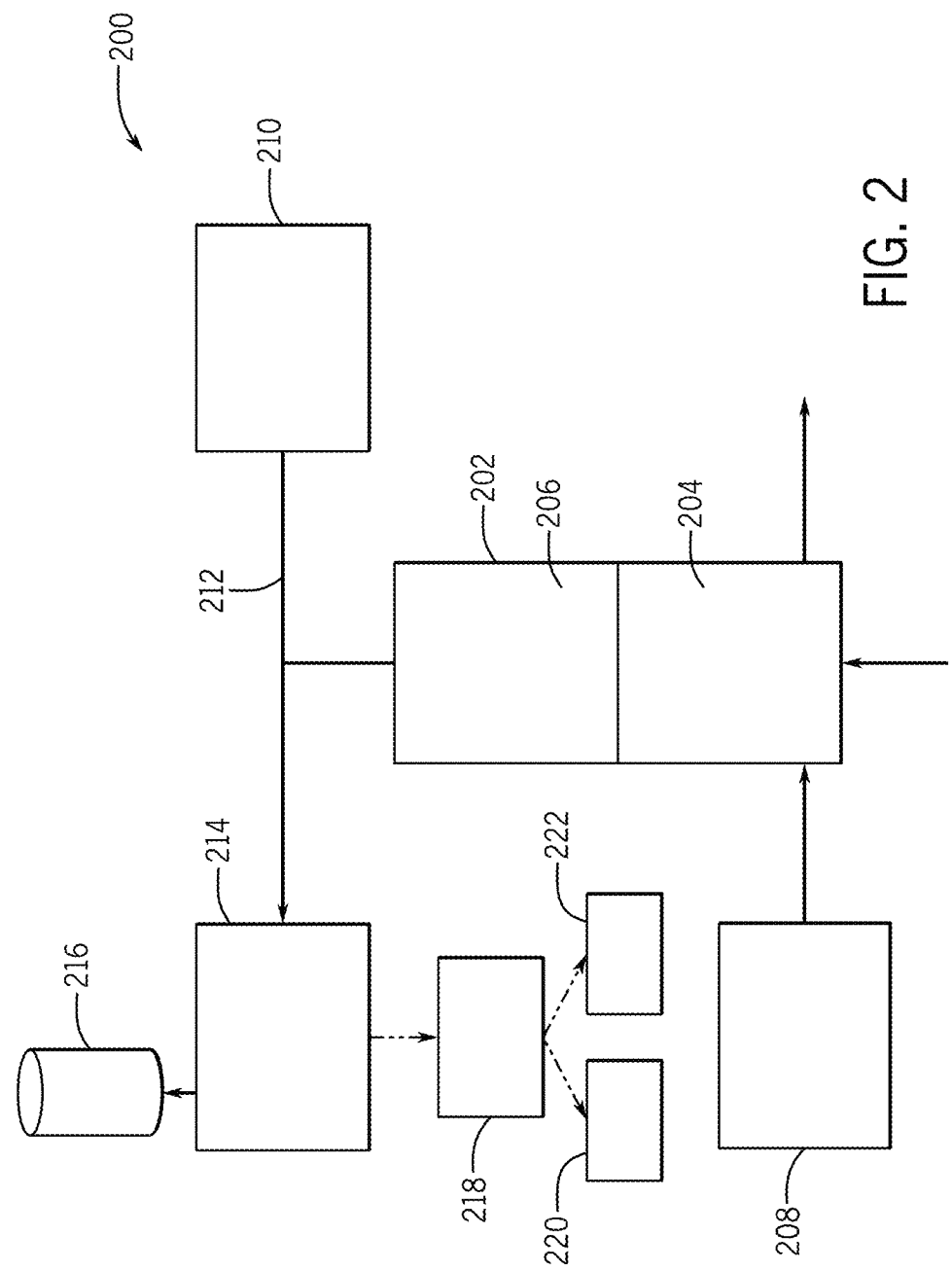
FIG. 2 illustrates a schematic representation of an example fission product extraction system.

Turning now to FIG. 2, an example extraction system 200 is shown. The extraction system 200, may be substantially analogous to the extraction system 101 in that it is configured to extract fission products dissolved in molten salt of a molten salt reactor system (e.g., molten salt reactor system 100). In many embodiments, the vessel 202 may be a reactor access vessel (e.g., reactor access vessel 110), a drain tank (e.g., drain tank 108), a glovebox, a hot cell, or any other component or vessel of a molten salt reactor system. In one embodiment, the vessel 202 is a separate vessel than the reactor access vessel. In one embodiment, the vessel 202 is a glovebox or hot cell separated from the MSR system but fluidly connected to the molten salt loop. In some embodiments, the vessel 202 may include a container capable of housing and handling the molten salt (i.e., heat resistant). For clarity, in embodiments where the vessel 202 is a glovebox, hot cell, or similar shielded containment structure, the vessel 202 may further include a heat resistant container configured to retain the molten salt. The vessel 202 may be generally coupled with or a part of the molten salt loop of a MSR system. Consequently, the vessel 202 may receive a flow of irradiated fueled molten salt. In many embodiments, the vessel 202 is downstream of the reactor vessel (e.g., reactor vessel 102) of the MSR system, such that the molten salt flowing thereto is irradiated and comprises fission products (e.g., molybdenum hexafluoride). Therefore, the vessel 202 may generally include a molten salt phase 204 and a gaseous phase 206.

The vessel 202 may be fluidly connected to a first gas conduit 208 through piping or tubing operable to sparge the vessel 202 of dissolved gases. The connection may generally be such that the first gas conduit 208 is operable to feed a gas into a volume of the vessel 202. In many embodiments, the first gas conduit 208 feeds an inert gas into the liquid or molten phase 204 of the vessel 202. The gas emitted by the first gas conduit 208 may be generally configured as to not react with the contents of the molten salt of the liquid phase 204. For example, the gas from the first gas conduit may be an inert gas, such as helium gas, neon gas, argon gas, xenon gas, radon gas, krypton gas, nitrogen gas, carbon dioxide, or other nonreactive gases known in the art.

The first gas conduit 208 may feed the inert gas into the vessel 202 and sparge the molten salt contained therein to dislodge dissolved fission products within the molten salt (e.g., molybdenum hexafluoride). By feeding a nonreactive gas into the liquid phase 204 of the vessel 202, the molten salt is agitated by contact with the sparging gas. This agitation causes dissolved fission products to dislodge from the molten salt and go into the gaseous phase 206 of the vessel 202. For example, the first gas conduit 208 may be a gas flushing apparatus operable to degas the molten salt. By emitting an inert gas into the vessel 202, the area of the gas-liquid interface increases which encourages some (if not all) of the dissolved gases to diffuse into the inert gas before the inert gas escapes the liquid phase 204. Thus, dislodging fission products from the irradiated fueled molten salt and facilitating the initial step for fission product capture.

The vessel 202 may be fluidly connected to a gas transfer assembly 112 that comprises piping connecting the vessel 202 to a second gas conduit 210 and a carboy 214. The second gas conduit 210 may be generally operable to feed a gas through the gas transfers assembly 212 to facilitate transfer of the dislodged fission products to the carboy 214. The dislodged fission products may then be dissolved in a solution of the carboy 214. The piping of the gas transfer assembly 212 may be connected to a portion of the vessel 206 containing the gaseous phase 206 through an outlet positioned at a top side of the vessel 202. The dislodged fission products, following sparging by the first gas conduit, may be present in the gaseous phase 206 and ascend into piping of the gas transfer assembly 212. The second gas conduit 210 feeds a gas into the gas transfer assembly in the direction of the carboy 214, such that the dislodged fission products are transferred from the gaseous phase 206 of the vessel 202 to the carboy 214. The gas may be generally fed from one end of the gas transfer assembly 212 to another end of the gas transfer assembly 212 where the carboy 214 is positioned. The gas may be emitted through a plurality of pores throughout the gas transfer assembly.

In several embodiments, the gas emitted by the second gas conduit 210 contains a halogenating agent in an inert gas solution. For example, nitrogen trifluoride in an argon solution. Other halogenating agents may be included, such as hydrogen fluoride, fluorine, hydrogen chloride, chlorine, or other halogenating gas known in the art. Advantageously, by inclusion of the halogenating agent, dislodged fission products are discouraged or prevented from depositing onto a surface of the piping of the gas transfer assembly. Advantageously, by inclusion of the halogenating agent in the gas of the second gas conduit, not only are the dislodged fission products directed towards the carboy 214, but any gaseous fission products that have deposited onto the piping of the gas transfer assembly 212 may be halogenated. For example, molybdenum hexafluoride may deposit onto a metal surface of the system, resulting in metallic molybdenum and fluorine gas. The metallic molybdenum may then react with the halogenating agent (e.g., nitrogen trifluoride) and be reconverted into gaseous molybdenum hexafluoride, thus resulting in capture.

In some embodiments, the piping of the gas transfer assembly 212 is equipped with a heating system. The heating system may comprise at least one heated wrap or external heater operable to heat the internal surface of the piping. Advantageously, by inclusion of the heating system, dislodged fission products are discouraged or prevented from depositing onto the surface of the piping.

The gas transfer assembly 212 may be fluidly connected to a carboy 214 configured to receive the dislodged fission products. The carboy 214 may be filled with a liquid solution configured to absorb the dislodged fission products. The gas transfer assembly 212 may include piping that extends into a volume of the carboy 214, such that as the dislodged fission products are transferred into the liquid solution of the carboy 214 to facilitate dissolution. In some embodiments, the carboy 214 may include an aqueous solution with an alkaline medium (such as, but not limited to, sodium hydroxide, potassium hydroxide, lithium hydroxide, calcium hydroxide, and other similar alkaline mediums). The basic aqueous solution may facilitate the processing and purification of the fission products. In some embodiments, the solution of the carboy 214 is made acidic by inclusion of an acid. The aqueous solution is configured such that the alkaline medium therein reacts with the fission products to facilitate their capture by causing them to be dissolved into the aqueous solution. For example, molybdenum hexafluoride may react with sodium hydroxide and water to produce sodium molybdate. This example may follow the reaction below.

$$MoF_6 + 8NaOH \rightarrow Na_2MoO_4 + 6NaF + 4H_2O$$

However, one of ordinary skill in the art will appreciate that molybdenum complexes will not be the only fission product captured by the extraction system, and subsequently dissolved in the solution of the carboy 214. Rather, one of ordinary skill in the art will appreciate that molybdenum will be one of many fission products captured by the extraction system and subsequently dissolved in the solution of the carboy 214. For example, technetium hexafluoride, iodine pentafluoride, antimony pentafluoride, xenon complexes, niobium pentafluoride, ruthenium hexafluoride, ruthenium tetroxide, and other fission product complexes may be dislodged and subsequently captured. Advantageously, the fission products captured by the extraction system may include isotopes of interest, such as iodine-131, strontium-90, and actinium-225.

In several embodiments, the carboy 214 may be fluidly connected to a charcoal trap or charcoal filter 216 configured to capture any gases not dissolved by the carboy 214. Due to the nature of the system, several different gases may make their way to the carboy 214. Consequently, not all gases transferred to the carboy 214 will be reactive with the solution therein and may persist in their gaseous form. The present invention anticipates this consequence and provides means to capture such gases (e.g., the charcoal filter 216). The charcoal filter 216 may be positioned on a top portion of the carboy 214, such that gas not dissolved therein ascends to the charcoal filter 216 where it may be captured.

The carboy 214 may be a component of the purification system, which may further include an extraction cartridge 218, a generator 220, and a waste container 222. Generally, the carboy 214 may be configured to pass the solution containing the dissolved fission products (i.e., alkaline solution containing fission product complexes, such as molybdate) to the extraction cartridge 218. Thereafter, the extraction cartridge 218 may be configured to isolate certain fission products from others and selectively pass them to the generator 220 or the waste container 222. However, following isolation of certain fission products, the waste container 222 may still include valuable fission products. For example, the waste container 222 may include compounds having iodine-131, strontium-90, or actinium-225. Thus, the waste container 222 may be utilized in separate purification techniques configured to isolate those select compounds, effectively facilitating their capture as well. Stated otherwise, while the present disclosure may focus on capturing and isolating molybdenum-99 compounds, compounds present in the waste container 222 may enable an operator to harvest both molybdenum compounds and other notable fission product compounds.

Figure 3:
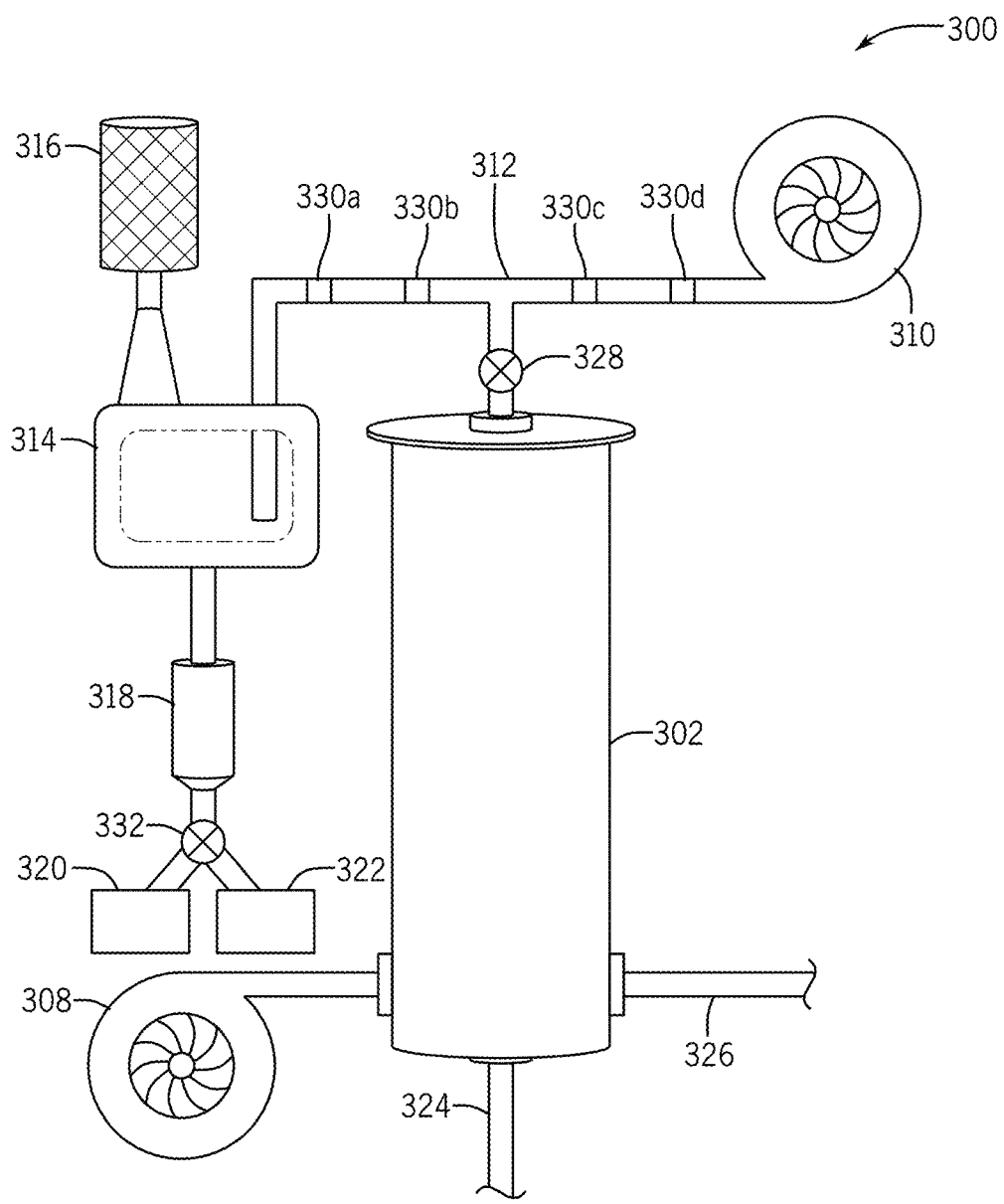
FIG. 3 illustrates an example fission product extraction system including gas transfer assembly and purification system.

Turning now to FIG. 3, which illustrates an example fission product extraction assembly 300. The example fission product extraction assembly 300 of FIG. 3 may be substantially analogous to the example fission product extraction system 200 of FIG. 2 and be fluidly connected to a vessel 302, and include a first gas conduit 308, a second gas conduit 310, a gas transfer assembly 312, a carboy 314, a charcoal filter 316, an extraction cartridge 318, a generator 320, and a waste container 322.

However, FIG. 3 highlights other components of the example fission product extraction assembly 300 that may be included for its implementation into an MSR system. For example, the vessel 302 may be fluidly connected to a molten salt loop of an MSR system through an inlet pipe 324 and outlet pipe 326 configured to facilitate flow of fueled molten salt into and out of the vessel 302. While FIG. 3 illustrates the inlet pipe 314 and outlet pipe 326 being positioned substantially at a bottom section of the vessel 302, one of ordinary skill in the art will appreciate that other configurations are contemplate by the present invention. The gas transfer assembly 312 may include a valve 328 configured to selectively connect a volume of the gas transfer assembly 312 to the volume of the vessel 302, such that an operator may control when to capture dislodged fission products.

The gas transfer assembly 312 may be fluidly connected to a second gas conduit 310 operable to facilitate transfer of the dislodged fission products to the carboy 314 by feeding a gas therein. The second gas conduit 310 may feed the gas in the direction of the carboy, such that as dislodged fission products ascend into the volume of the gas transfer assembly 312, they are pushed to the carboy 314. In several embodiments, the gas emitted by the second gas conduit 310 may include a halogenating agent, such as nitrogen trifluoride. Advantageously, the halogenating agent may be included to react with any deposited fission products, such that they are reconverted into a gaseous phase. The second gas conduit 310 may feed the gas into the gas transfer assembly 312 from a single point or from a plurality of pores positioned about the piping of the gas transfer assembly 312.

The gas transfer assembly 312 may be equipped with means to prevent or dissuade fission products from depositing onto a surface of the piping. For example, the gas transfer assembly 312 may include a heating system including a plurality of heaters 330a, 330b, 330c, 330d configured to heat a surface of the piping of the gas transfer assembly. The dislodged fission products may have a tendency to react with the surface of the gas transfer assembly 312, causing them to deposit thereto and avoid capture. For example, molybdenum hexafluoride may react with the metal surface of the piping of the gas transfer assembly 312 and discharge into solid molybdenum (i.e., metallic molybdenum) (e.g., molybdenum (III) fluoride, or molybdenum (IV) fluoride). In order to dissuade or prevent such reaction, the heat system including the plurality of heaters 330a, 330b, 330c, 330d, may be included to heat the piping of the gas transfer assembly 312 to dissuade such a reaction. The plurality of heaters 330a, 330b, 330c, 330d may be heat raps positioned on an outer surface of the piping. The heating may be caused by a heat wrap around the pipe, external heaters, or any other heat source.

The piping of the gas transfer assembly 312, may substantially extend into a volume of the carboy 314, as illustrated by the semi-transparent view of the carboy 314 of FIG. 3. Advantageously, this encourages the dislodged fission products to dissolve into the solution of the carboy 314 as they make ready contact with the liquid solution therein.

The carboy 314 may be fluidly connected to a charcoal filter 316, such that any undissolved gases are captured therein. The carboy 314 may further be fluidly connected to the extraction cartridge 318 where the dissolved fission products are transferred continuously or by batch to be purified therein.

Upon dissolution into the carboy 314, the fission products may undergo purification by the purification system, which may include the carboy 314, extraction cartridge 318, generator 320, and waste container 322. The purification system may include a three-way valve 328 positioned on piping connection the extraction cartridge 318 to the generator 320 and waste container 322. By inclusion of the three-way valve 332, an operator may facilitate the isolation process by directing solution from the extraction cartridge 318 to either the generator 320 or the waste container 322. For example, the extraction cartridge 318 may be configured to absorb molybdate from the solution of the carboy and elute other fission products. In this example, an operator (optionally by remote control) may activate the three-way valve 332 to direct the solution eluted from the extraction cartridge 318 to the waste container 322 to collect the unselected fission products (i.e., not molybdate). The waste container 322 may then be remove for further processing or for disposal, depending on the need. The extraction cartridge 318 may then be washed to elute the molybdate, following activation of the three-way valve 332 to direct the eluted molybdate to the generator 320.

The molten salt inlet pipe 324 may be a pipe on a fuel salt loop (e.g., system 100), whereby molten fuel salt with fission products present flows into the vessel 302. The molten salt outlet pipe 326 may also be a pipe on the fuel salt loop (e.g., system 100), whereby molten fuel salt with a lesser amount of fission products present, flows out of the vessel 302. In one or more embodiments, the vessel 302 may have some amount of molten fuel salt within the vessel, and may also have some amount of air or gas within the vessel 302. In one alternate embodiment, the vessel 302 may only have a molten salt phase within the vessel 302 (i.e., the vessel 302 is filled with molten fuel salt). The vessel 302 may also include a phase boundary between the molten salt phase and the gas phase.

In many embodiments, the first gas conduit 308 is connected to the vessel 302, such that inert gas may be pumped from an inert gas supply (IG) into the molten salt phase of the vessel 302. In some embodiments, the first gas conduit 308 includes a pipe that may protrude into the vessel 302 by some distance such that the inert gas is inserted into the molten salt phase proximate to the middle of the vessel 302, or the first gas conduit 308 may not protrude into the vessel 201, such that an opening of the pipe of first gas conduit 308 is flush with an opening in a wall of the vessel 302. In at least one embodiment, the gas transfer assembly 312 is also connected at the top of the vessel 302 proximate to the gas phase.

The carboy 314 may include a solution of water with an alkaline medium (e.g., sodium hydroxide, potassium hydroxide, lithium hydroxide, calcium hydroxide, and other similar alkaline media), such that the resulting aqueous solution has a basic pH level. As the $MoF_6$ gas is bubbled through the aqueous solution, it reacts to form sodium molybdate. The molybdate is dissolved in the aqueous solution, which is sent, in either a batch or in a continuous flow from the carboy 314, to the extraction cartridge 318 for further purification.

The vessel 302 may be fully enclosed, other than the inlet pipe 324, first gas conduit 308, outlet pipe 326, gas transfer assembly 312, but may also have additional openings and piping inlets and outlets, for other applications within the molten salt reactor system. The vessel 302 may be made of stainless steel or other similar metals and metal alloys that can withstand the internal heat and radiation levels within the molten salt reactor system. The molten salt inlet pipe 324, molten salt outlet pipe 326, first gas conduit 308, and gas transfer assembly 312 may also be made out of stainless steel or other similar materials, and, in some embodiments, may also be coated with a nickel alloy. The molten salt inlet pipe 324, molten salt outlet pipe 326, first gas conduit 308, and gas transfer assembly 312 may be connected to the vessel 302 via welding, connection ports, or other known connection methods. Each of the molten salt inlet pipe 324, molten salt outlet pipe 326, first gas conduit 308, and gas transfer assembly 312 may also have a separate valve or series of valves, such that each of the pipes may be closed or opened, either manually or remotely.

The present invention contemplates several sparging apparatuses connected to the first gas conduit configured to facilitate sparging of the vessel. Generally, the sparging apparatus includes a porous member where inert gas from the first gas conduit is fed into the vessel. The sparging apparatus may be a porous rod extending into a lower volume of the liquid phase of the vessel. The sparging apparatus may include a vertically extending support member with a plurality of spinning porous blades. The sparging apparatus may also include a porous toroidal tube positioned at a lower section of the vessel configured to feed the inert gas about an internal peripheral of the vessel.

Figure 4:
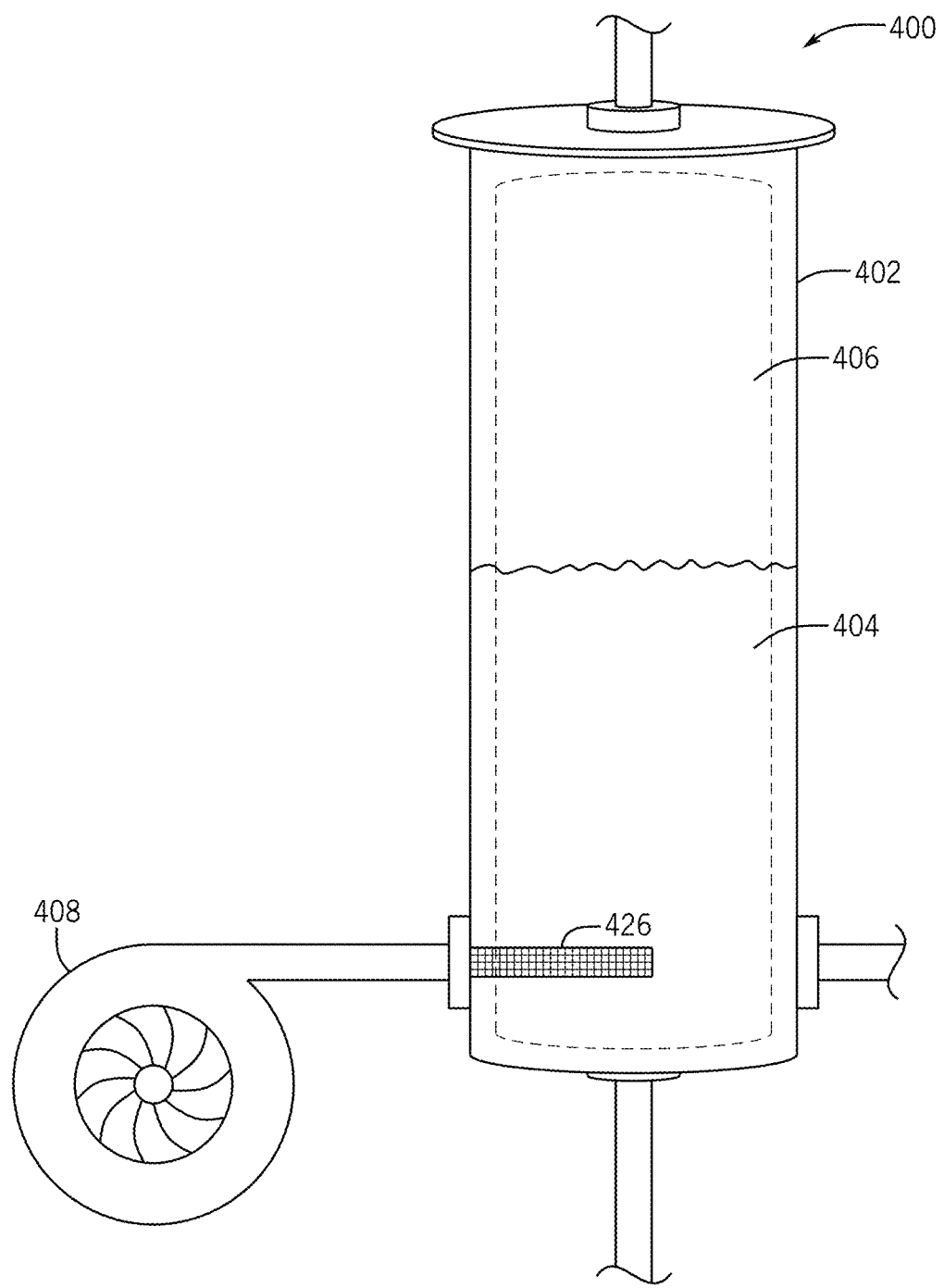
FIG. 4 illustrates a cutaway view of another example fission product extraction system.

Turning now to FIG. 4, which illustrates an example fission product extraction system 400. The example fission product extraction system 400 of FIG. 4 may be substantially analogous to that of FIG. 2 and include a vessel 402, a liquid phase 404, a gaseous phase 406, and a first gas conduit 408. FIG. 4 provides a semi-transparent view of the vessel 402, such that an example sparging apparatus 426 of the extraction assembly is in view. In this example, the sparging apparatus 426 is a porous rod extending into the volume of the vessel 402 within the liquid phase 404 from the first gas conduit. The sparging apparatus 426 is fluidly connected to the first gas conduit 408. The sparging apparatus 426 may include a plurality of pores operable to feed the inert gas into the liquid phase 404, facilitating sparging of the molten salt. Advantageously, by extending into the volume of the vessel within the liquid phase 404, the inert gas feed thereto agitates the contents of the molten salt and dislodges and dissolved gases therein. For example, the sparging apparatus 426 may be configured to dislodge dissolved molybdenum hexafluoride from the irradiated fueled molten salt. The sparging apparatus 426 may be operable to degas the contents of the vessel 404.

Figure 5:
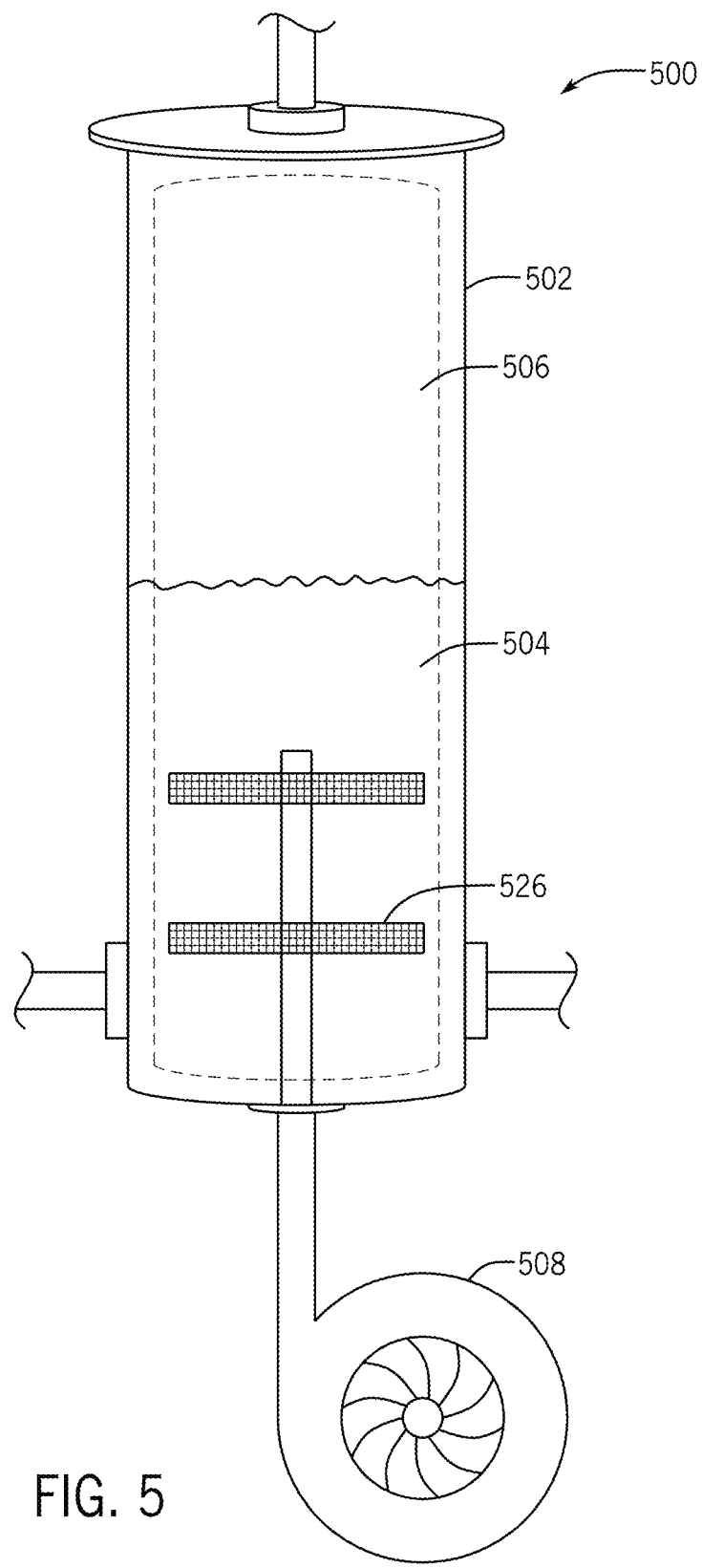
FIG. 5 illustrates a cutaway view of another example fission product extraction system.

Turning now to FIG. 5, which illustrates an example fission product extraction system 500. The example fission product extraction system 500 of FIG. 5 may be substantially analogous to that of FIG. 2 and include a vessel 502, a liquid phase 504, a gaseous phase 506, and a first gas conduit 508. FIG. 5 provides a semi-transparent view of the vessel 502, such that an example sparging apparatus 526 of the extraction assembly is in view. The sparging apparatus 526 is fluidly connected to the first gas conduit 508. The sparging apparatus 526 may include a plurality of pores operable to feed the inert gas into the liquid phase 504, facilitating sparging of the molten salt. The example sparging apparatus 526 comprises a vertically extending support member with a plurality of horizontally extending spinning blades. The horizontally extending blades may be configured to spin about the vertically extending support member. In some embodiments the entire sparing apparatus 526 is porous, including the vertical support member and the horizontal blades, while in other embodiments only the horizontal blades are porous. Advantageously, by inclusion of horizontal spinning blades the molten salt may be turned as inert gas is fed into the vessel 502. This may increase the agitation within the liquid phase 504 of the vessel 502, leading to increased efficacy of the system. Stated otherwise, by including a sparging apparatus 526 that is operable to both feed inert gas into the vessel 502 and turn the liquid phase 504, more gases may be dislodged due to the increased agitation of the liquid phase 504.

Additionally, FIG. 5 illustrates an alternative configuration of the inlet pipe, outlet pipe, and first gas conduit, demonstrating the adaptability of the present invention. Stated otherwise, FIG. 5 illustrates how the present invention may be adapted to fit any MSR system design. For example, the molten salt inlet pipe may contact the vessel on a left side of the vessel while the molten salt outlet pipe contacts the vessel on a right side of the vessel. In order to accommodate this configuration, the gas conduit may be positioned at an underside of the vessel.

Figure 6:
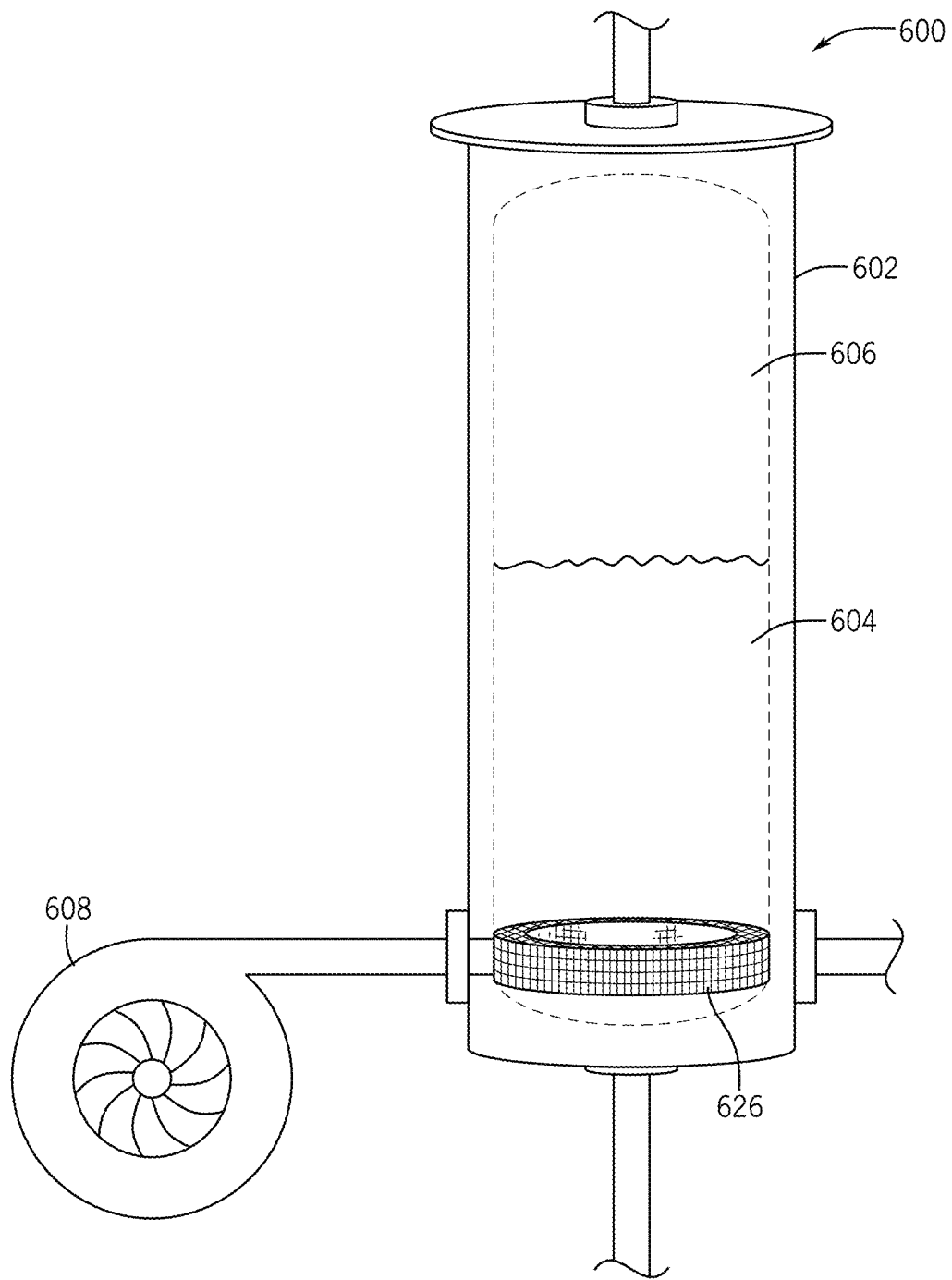
FIG. 6 illustrates a cutaway view of yet another example fission product extraction system.

Turning now to FIG. 6, which illustrates an example fission product extraction system 600. The example fission product extraction system 600 of FIG. 6 may be substantially analogous to that of FIG. 2 and include a vessel 602, a liquid phase 604, a gaseous phase 606, and a first gas conduit 608. FIG. 6 provides a semi-transparent view of the vessel 602, such that an example sparging apparatus 626 of the extraction assembly is in view. The sparging apparatus 626 is fluidly connected to the first gas conduit 608. The sparging apparatus 626 may include a plurality of pores operable to feed the inert gas into the liquid phase 604, facilitating sparging of the molten salt.

The example sparging apparatus 626 comprises a porous toroidal tube positioned at a lower section of the vessel 602. The porous toroidal tube may be positioned such that a circumference of the sparging apparatus 626 is in close proximity to an interior surface of the vessel 602. Due to this placement and configuration, the example sparging apparatus 626 is operable to feed the inert gas about an internal periphery of the vessel 602. Importantly, fission products contained within the irradiated fueled molten salt may have a tendency to react with metal surfaces of the MSR system, this includes the interior surface of the vessel 602. Therefore, it is important to prevent or minimize contact of the dissolved fission products with the surfaces of the vessel 602. Advantageously, the present invention contemplates a sparging apparatus specifically design to prevent such contact. The porous toroidal tube emits the inert gas about the internal surface of the vessel 602 and as it ascends, produces a "curtain" or a wall of inert gas bubbles that both sparge the molten salt of dissolved fission products and prevents them from contacting the walls of the vessel and depositing thereto. Thus, the efficacy of the fission product extraction system is increased by reducing the amount of fission products evading capture by contact with the vessel walls.

The present invention contemplates a fission product extraction system that does not include the first gas conduit. In some embodiments, the fission product extraction system dislodges fission products by decreasing the pressure of the vessel. In these embodiments, the fission product extraction system includes a bypass configured to isolate the vessel and includes a valve connecting a volume of the vessel to a volume of the gas transfer assembly. In order to decrease the pressure of the vessel and consequently dislodged the fission products contained within the fueled molten salt, an operator (or by remote control) may first isolate the vessel utilizing the bypass, then open the valve connecting the gas transfer assembly to the vessel. By opening the valve of the gas transfer assembly, the volume of the vessel is effectively increased by adding its volume to that of the gas transfer assembly. Upon decreasing the pressure of the vessel, by increasing its volume, the fueled molten salt is degassed and dissolved fission products are dislodged.

Figure 7:
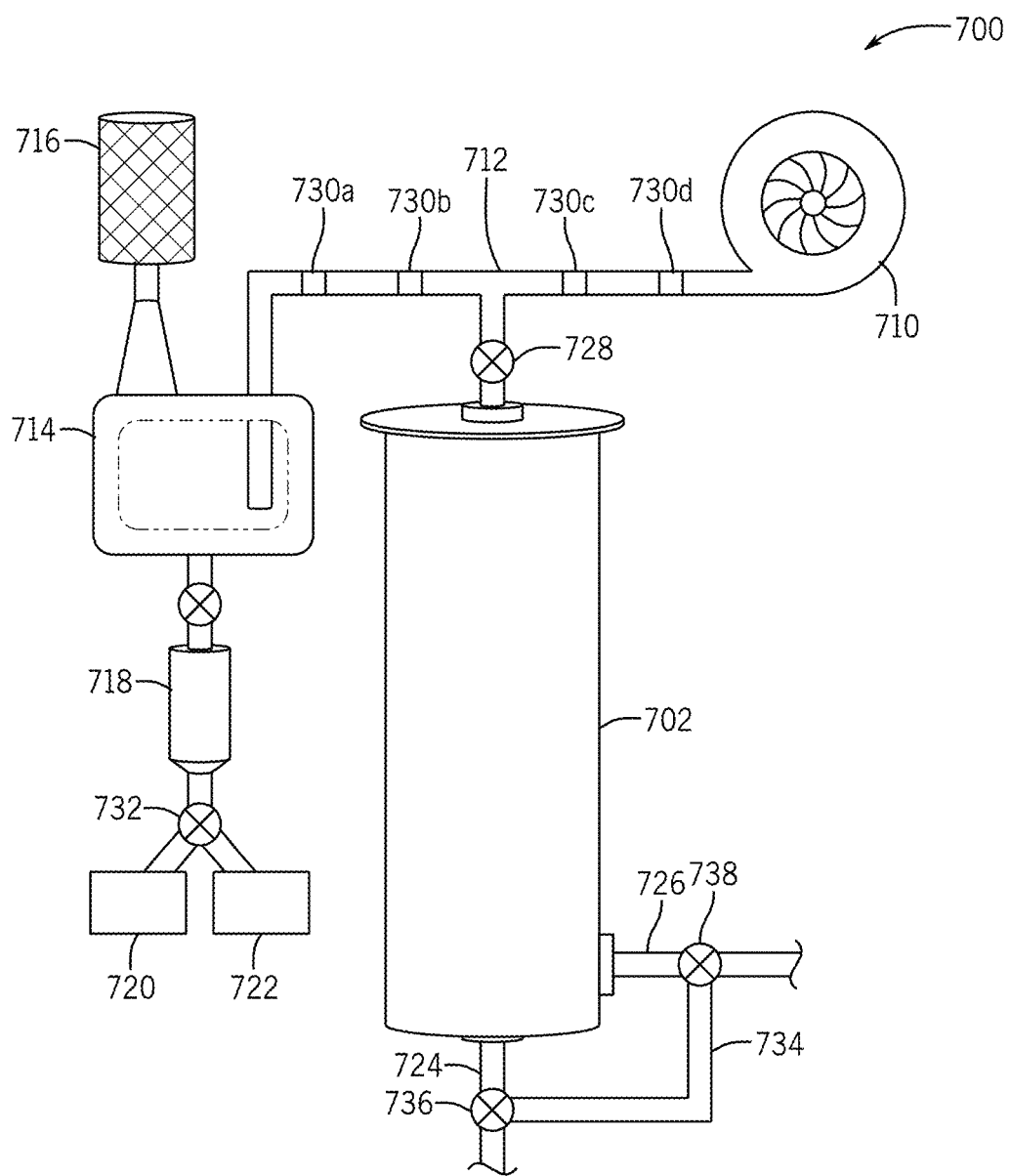
FIG. 7 illustrates another example fission product extraction system including gas transfer assembly and purification system.

Turning now to FIG. 7, which illustrates an example fission product extraction assembly 700. The example fission product extraction assembly 700 of FIG. 7 may be substantially analogous to that of FIG. 3 and be fluidly connected to a vessel 702, and include a second gas conduit 710, a gas transfer assembly 712, a carboy 714, a charcoal filter 716, an extraction cartridge 718, a generator 720, a waste container 722, a molten salt inlet pipe 724, a molten salt outlet pipe 726, a gas transfer assembly valve 728, and a plurality of heaters 730a, 730b, 730c, 730d. However, the example fission product extraction assembly 700 of FIG. 7 includes an extraction assembly that does not include a first gas conduit and includes a bypass 734 including a first bypass valve 736 and a second bypass valve 738. The bypass 734 may be configured to divert the flow of molten salt from the vessel 702, essentially isolating the vessel 702 from the molten salt loop. This may be accomplished by activating the bypass valves 736, 738 such that molten salt passes through the bypass and not into the vessel 702.

The example fission product extraction assembly 700 is operable to dislodge dissolved fission products despite not including a first gas conduit or sparging apparatus. Instead, the fission product extraction system 700 utilizes a change in partial pressure to make it more environmentally stable for the dissolved fission products to be in a gaseous phase of the vessel, rather than its liquid phase. Notably, the gas transfer assembly 712 includes a gas transfer assembly valve 728, which is operable to selectively connect a volume of the gas transfer assembly 712 to that of the vessel 702, effectively increasing the volume of the vessel 702. By isolating the vessel 702 and then opening the gas transfer assembly valve 728 the pressure of the vessel 702 decreases and the dissolved fission products therein are dislodged. Thereafter, the dislodged fission products may continue through the gas transfer assembly 712 into the carboy 714 and through the purification system in a substantially similar way to the other example fission product extraction systems discussed.

The fission product extraction assembly 700 may include the example purification systems previously described. Notably, despite not including the same mechanism for dislodging dissolved fission products from irradiated molten salt, the example fission product extraction assembly 700 may still employ the same or substantially similar purification systems and gas transfer assemblies as previously described in relation to other example embodiments. For example, the gas transfer assembly 712 may include a gas outlet positioned on a top side of the vessel 702, whereby the gaseous fission products may ascend to upon dislodgement. As another example, the second gas conduit 710 may be configured to feed a gas throughout piping of the gas transfer assembly 712 and/or in the direction of the carboy 714, such that the dislodged fission products are deposited into the carboy 714. As another example, the extraction cartridge 718 may be a Solid Phase Extraction (SPE) cartridge with a sorbent configured to selectively isolate certain fission products from others. The sorbent may be configured to absorb selected fission products and elute others. In this example, the selected fission products may comprise molybdenum compounds, and the sorbent may be washed with a solvent to elute the molybdenum compounds into the generator 720. The sorbent may be an alumina sorbent, silica sorbent, a polymer sorbent, an inorganic sorbent, or other sorbent known in the art. As another example, the example extraction system 700 may receive a flow of irradiated fueled molten salt following fission in a reactor of the MSR system, such that the molten salt includes dissolved fission products. As another example, the irradiated molten salt may include molybdenum complexes, such as molybdenum hexafluoride. As another example, the gas emitted from second gas conduit 710 may including a halogenating agent, such as nitrogen trifluoride.

Figure 8:
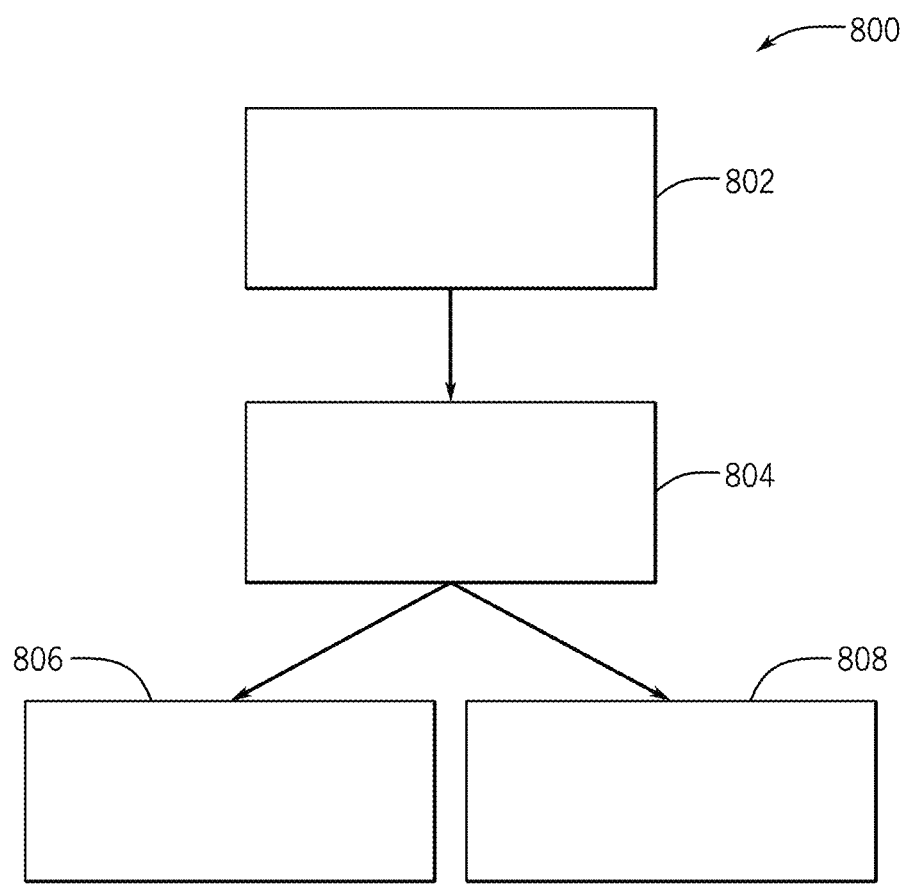
FIG. 8 illustrates a schematic representation of an example purification system.

The present invention includes a purification system configured to isolate selected fission products from others. FIG. 8 illustrates a schematic diagram of an example purification system 800. The purification system 800 may generally include the carboy 802, an extraction cartridge 804, a generator 806, and a waste container 808. The carboy 802 may generally include a liquid solution configured to dissolve the dislodged fission products therein. The extraction cartridge 804 may be generally operable to facilitate column chromatography to isolate selected fission products from others. In several embodiments, the extraction cartridge 804 is a Solid Phase Extraction (SPE) cartridge. The generator 806 may be a technetium-99m generator (sometimes referred to as a "moly-cow") operable to extract metastable isotopes from molybdenum-99. The waste container 808 may be generally included to collect unselected fission products for disposal or for further processing. The purification system 800 may be configured to isolate molybdate from other fission products captured by the fission product extraction system, such that the output of the extraction cartridge 804 is a sample fit for inclusion in the generator 806. In several embodiments, the purification system 800 is fluidly connected to the fission product extraction system, while in some embodiments the purification system 800 may be removed from the MSR system and remaining extraction assembly for offsite processing. Stated otherwise, while the example systems described herein illustrate the purification system 800 as being connected to the gas transfer assembly, it may be reversibly removed such that purification occurs offsite. For example, the carboy 314 of FIG. 3 may be removed from the gas transfer assembly 312, thereby causing the purification process (facilitated by, for example, purification system 800 to occur offsite or remote from the MSR system. Similarly, the extraction cartridge 318 of FIG. 3 may be removed from the carboy for offsite processing. In some embodiments, the carboy 802, extraction cartridge 804, the generator 806, and/or the waste container 808 may be reversibly removable from the extraction assembly.

The present invention contemplates several methods of utilizing the extraction cartridge 804 to isolate selected fission products. For example, the extraction cartridge 804 may include a sorbent configured to absorb the selected fission product while not interfacing with other unselected fission products. In another example, the extraction cartridge 804 may include a sorbent configured to absorb unselected fission products and not interface with selected fission products. In yet another example, the extraction cartridge 804 includes an alumina sorbet configured to absorb molybdate ions from sodium molybdate while allowing other fission products to be eluted. In this example, the extraction cartridge 804 is configured to initially exude unselected fission products into the waste container 808 while the molybdate ions concentrate within the sorbent of the extraction cartridge 804 (i.e., concentrated over time as more solution from the carboy 802 is passed through the extraction cartridge 804). Then, the extraction cartridge may be configured to pass solution into the generator and be washed by a solution configured to remove the molybdate from the sorbent, thus depositing the molybdate (i.e., selected fission products) into the generator 806.

Figure 9:
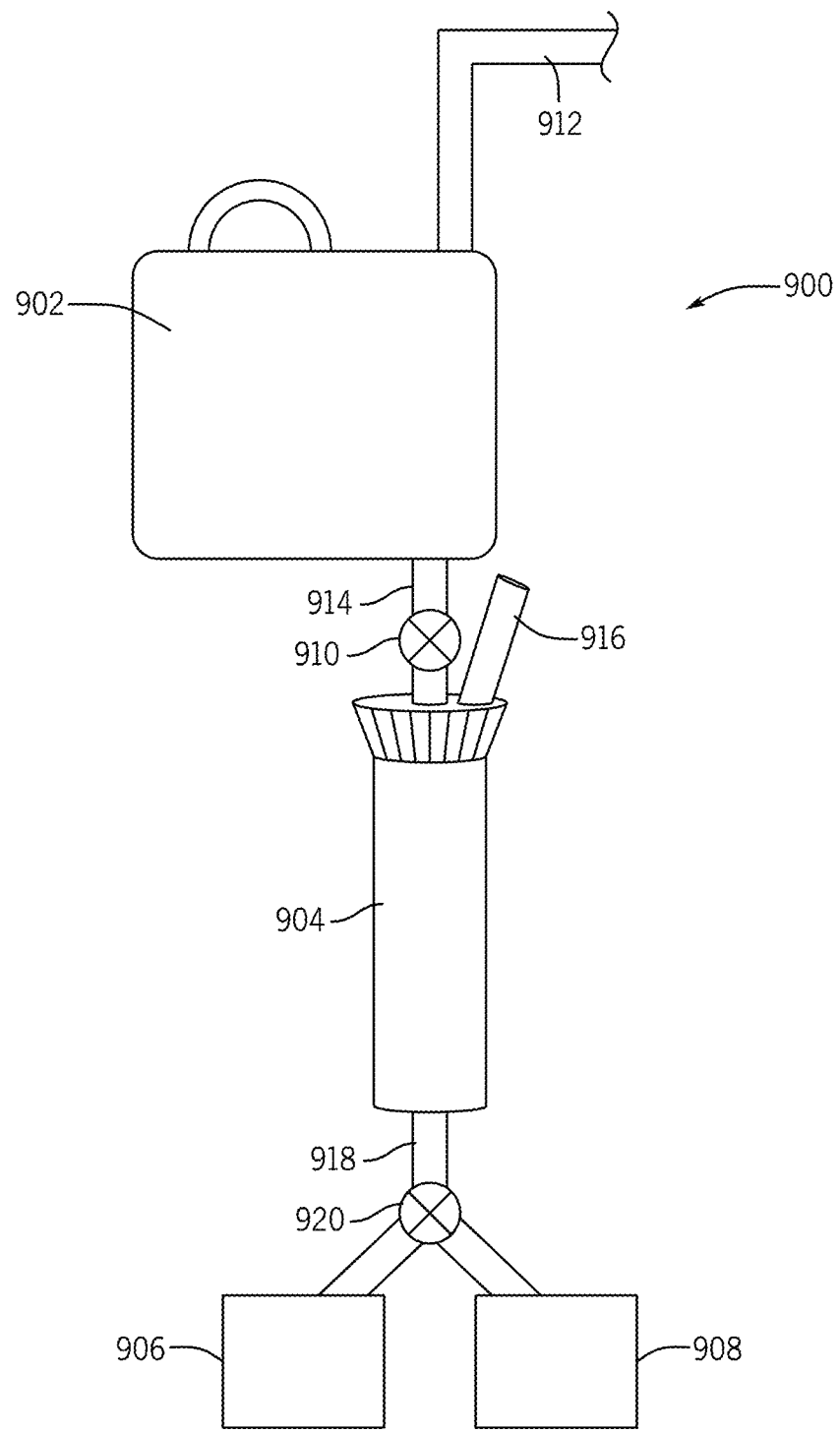
FIG. 9 illustrates an example purification system.

Turning now to FIG. 9, an example purification system 900 is illustrated. The example purification system 900 may be substantially analogous to that of FIG. 8 and include a carboy 902, an extraction cartridge 904, a generator 906, and a waste container 908. Notably, the example purification system 900 may be used to purify dislodged fission products extracted using the example fission product extraction systems and assemblies described herein. For example, the example purification system 900 may be configured to purify fission products extracted using the extraction assembly 300 or the extraction assembly 700 of FIGS. 3 and 7 respectively. FIG. 9 highlights other components of the purification system 900 that may be included for its implementation into the fission product extraction system. For example, the purification system 900 may be fluidly connected to piping of a gas transfer assembly 912 by the carboy 902, such that dislodged fission products may be received. Additionally, the purification system 900 may include a valve 910 and piping 914 connecting the carboy 902 to the extraction cartridge 904, such that the solution of the carboy 902 may be selectively provided to the extraction cartridge 904. The extraction cartridge 904 may include an inlet 916, to facilitate inclusion of a washing solution for washing of the extraction cartridge 904. The extraction cartridge 904 may be fluidly connected to the generator 906 and waste container 908 through piping 918 and a three-way valve 920 configured to selectively connect the extraction cartridge 904 to the generator 906 or the waste container 908. Advantageously, this configuration enables seamless processing of the dislodged fission products by including connected components.

Generally, the present invention includes an extraction cartridge for isolating molybdenum complexes from other fission products. The cartridge may be a Solid Phase Extraction (SPE) cartridge that generally includes a cylindrical volume and a sorbent bed sandwiched by fritted filter discs. In one example, the sorbent bed may generally be configured to absorb molybdate and elute other fission products, such that as the fission product sample from the carboy is poured into the cartridge, molybdate is concentrated into the sorbent bed while the remaining fission products pass through the sorbent bed and into a waste or other container for further processing.

Figure 10:
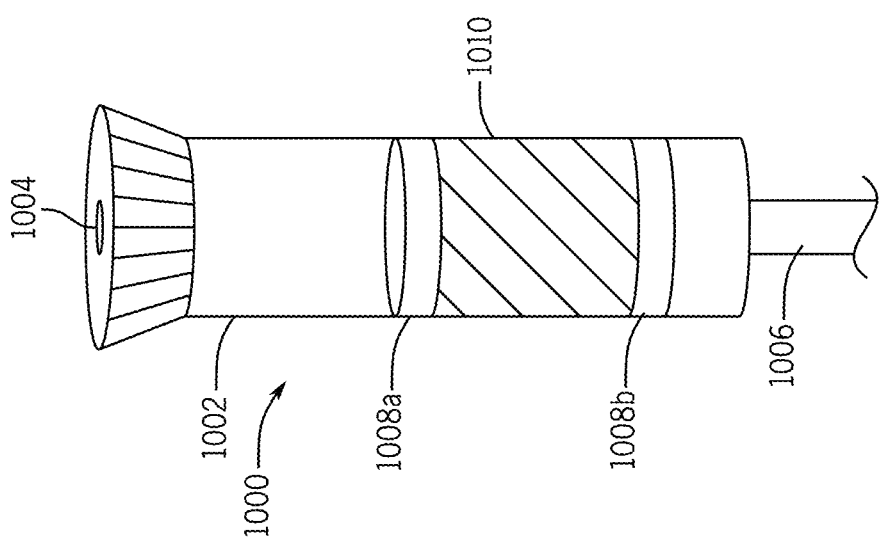
FIG. 10 illustrates a cross-sectional view of an example extraction cartridge.

Turning now to FIG. 10, an example extraction cartridge 1000 is illustrated. The example extraction cartridge 1000 may be that of extraction cartridge 218, 318, 718, or 904. The extraction cartridge 1000 may generally include a body 1002, and inlet 1004, an outlet 1006, fritted filter discs 1008*a*, 1008*b*, and a sorbent bed 1010. The body 1002 may be generally configured to house the fritted filter discs 1008*a*, 1008*b* and the sorbent bed 1010. The inlet 1004 may be generally configured to receive fluid from the carboy while the outlet 1006 may be generally configured to facilitate passage of fluid to the generator or waste container. For example, the inlet 1004 may receive solution from carboy 314, 714, 802, or 902. The fritted filter disc 1008*a* may be configured to capture and filter larger particles entering the extraction cartridge 1000, the sorbent bed 1010 may be configured to capture and absorbed fission products or elute fission products depending on the specific chromatography method employed, and fritted filter disc 1008*b* may be configured to capture any undesired particles as they exit the extraction cartridge 1000. For example, the sorbent bed 1010 may be an alumina sorbent configured to absorb molybdate ions and retain them therein. In this example, as solution from the carboy is passed through the extraction cartridge 1000, the sorbent bed 1010 is enriched and concentrated with molybdate ions, while unselected fission products do not interface with the sorbent bed 1010 and are consequently passed through. Following this example, after a predetermined or desired amount of molybdate is absorbed in the extraction cartridge, the molybdate may be washed from the sorbent bed 1010 and passed to a generator for further processing. Advantageously, the purification system is operable to produce a sample ready for input into a technetium-99m generator.

Generally, molybdenum-99 may undergo beta decay to form technetium-99m, a valuable medical radioisotope. However, given technetium-99m's short half-life of only about 6 hours, medical practitioners will keep and store molybdenum-99 (having a half-life of about 66 hours), as it is more practical. Generators are used to store molybdenum-99 and process it into technetium-99m for medical use.

Advantageously, the present invention is operable to produce a sample to be processed by a technetium-99m generator, sometimes referred to as a "technetium cow" or "moly cow" and referred to herein simply as the "generator." Following isolation by the cartridge, the resulting fission product sample may be in the form of a molybdate solution. The molybdate solution may be input directly into the generator for processing into technetium-99m ($^{99m}Tc$).

The generator may generally include a plastic exterior, an internal radiation shielding layer, and input for molybdate (or other saline solution), internal tubing, a glass column composed of alumina sorbent and glass frit, a filter, and an output for pertechnetate.

The generator may generally include a column chromatography module operable to absorb molybdate until it decays into pertechnetate. An operator may then pore a saline solution (e.g., sodium chloride) into the input of the generator, which causes the pertechnetate to be eluted and collected for use.

Figure 11:
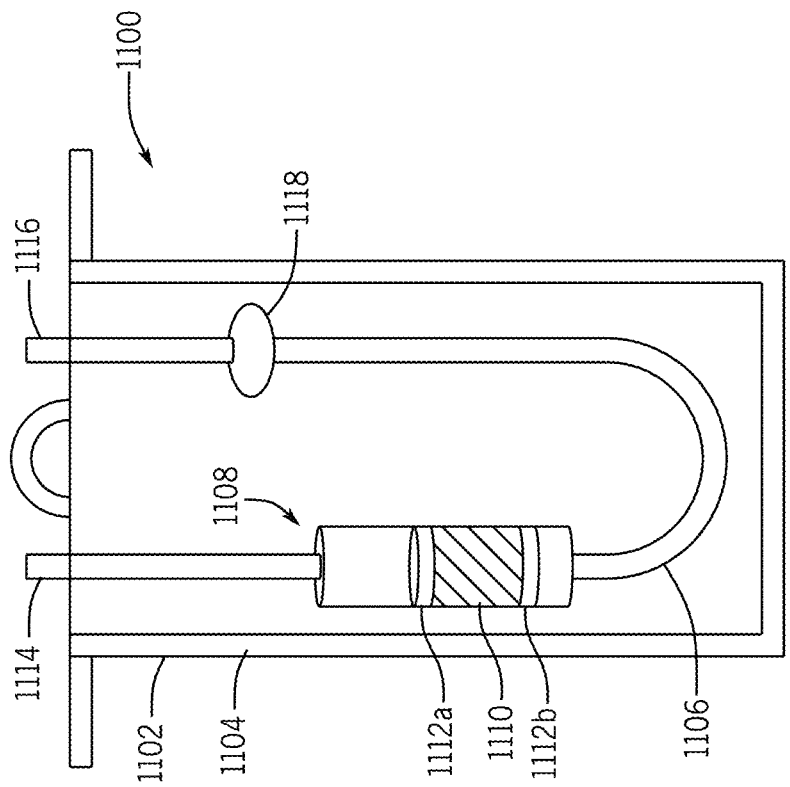
FIG. 11 illustrates a cross-sectional view of an example generator.

Turning now to FIG. 11, an example generator 1100 is illustrated. The example generator 1100 may be that of generator 220, 320, 720, or 806. The generator 1100 may generally include an outer body 1102 surrounding an internal radiation shielding layer 1104 with an inlet 1114 for introducing solution (e.g., molybdate) and an outlet 1116 for dispensing solution (e.g., pertechnetate) connected to internal tubing 1106. For example, the inlet 1114 may be configured to receive solution from outlet 1006 of the example extraction cartridge 1000. The generator 1100 may further include internal tubing 1106, a column module 1108, and a filter 1118. The internal tubing 1106 may be configured for carrying the input solution throughout the generator 1100, such that it travels through the column module 1108 containing a sorbent bed 1110 sandwiched by glass frits 1112*a*, 1112*b*. The column module 1108 may be found along the path of the internal tubing 1106, such that solution may be passed through. Finally, the generator 1100 may include a filter 1118 for capturing any undesired species. The column module 1108 may be generally configured to absorb molybdate, such that it may undergo beta decay, thereafter and operator may pass a washing solution therethrough causing pertechnetate to be eluted.

Figure 12:
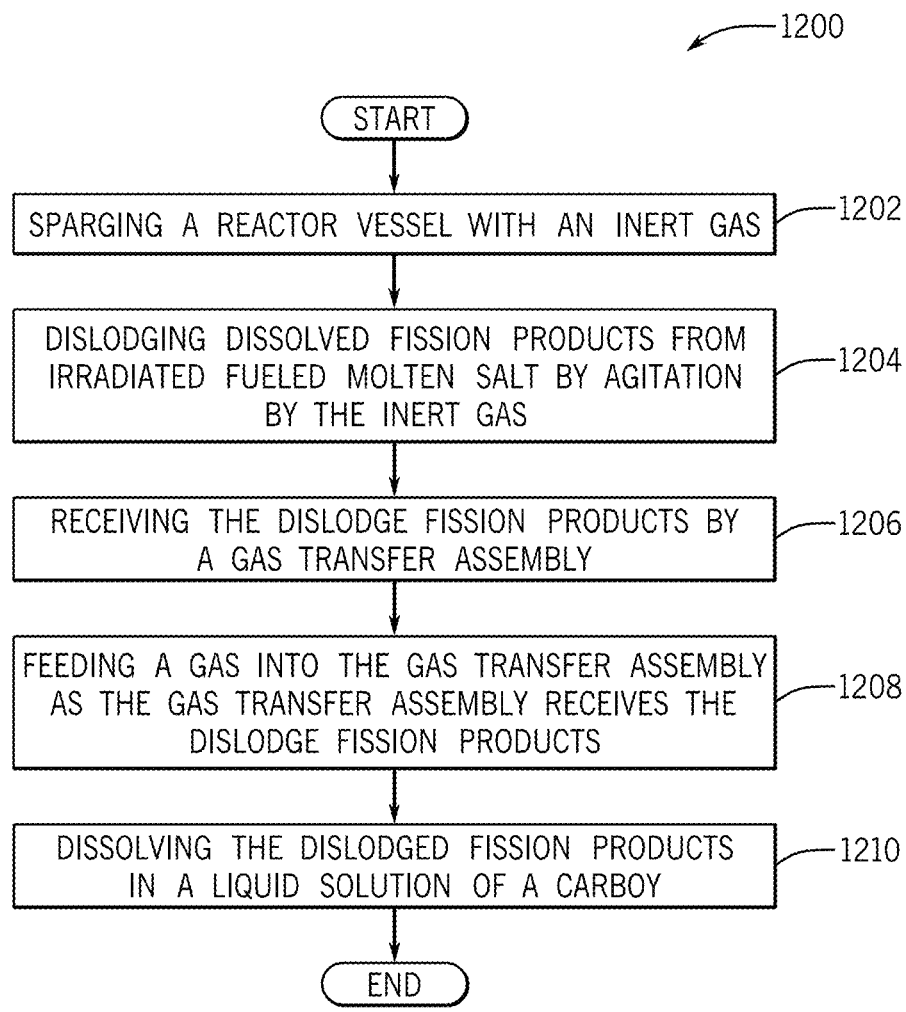
FIG. 12 illustrates a flow diagram of an example method for capturing fission products.

Turning now to FIG. 12, which illustrates a flow diagram of an example method 1200 for extracting fission products from irradiated fueled molten salt of a molten salt reactor system. The steps associated with FIG. 12 may be carried out by the components illustrated in FIGS. 2-6. At step 1202 a reactor access vessel that is fluidly connected to a molten salt loop of the molten salt reactor system is sparged with an inert gas. The reactor access vessel may be the vessel 110, 202, 302, 402, 502, 602, or 702, while the molten salt reactor system may be the example system 100 illustrated in FIG. 1. Additionally, the vessel may be sparged with any one of the sparging apparatuses previously discussed, such as sparging apparatus 426, 526, or 626. The inert gas may be feed to such apparatuses by the first gas conduit 308, 408, 508, or 608 and may emit a nonreactive gas such as helium gas. At step 1204, the fission products may be dislodged from the irradiated fueled molten salt by agitation with the inert gas. This may be accomplished during sparging by the sparging apparatuses 426, 526, or 626, essentially degassing the vessel. At step 1206, the dislodged fission products are received by the gas transfer assembly. For example, the dislodged fission products may be present in the gaseous phase of the vessel, such as gaseous phase 406, 506, or 606 of vessel 402, 502, or 602. Additionally, the dislodged fission products may ascend into the gas transfer assembly 212 or 312. At step 1208, a gas is fed into the gas transfer assembly as it receives dislodged fission products. The gas in this step may be fed into the gas transfer assembly by the second gas conduit 210 or 310. The gas may be an inert gas and/or include a halogenating agent, such that any deposited fission products react with the halogenating agent and turn back into a gaseous complex. The gas may be fed in the direction of the carboy to facilitate transfer of the fission products therein, this may be accomplished by a single entry point or by a plurality of pores positioned throughout the gas transfer assembly. At step 1210, the dislodged fission products may be dissolved in a liquid solution of the carboy. The carboy may be carboy 214, 314, 802, or 902. As previously discussed, the carboy may include a solution configured to dissolve the dislodged fission products. For example, the solution within the carboy may be an aqueous solution with a hydroxide medium, such as sodium hydroxide.

Figure 13:
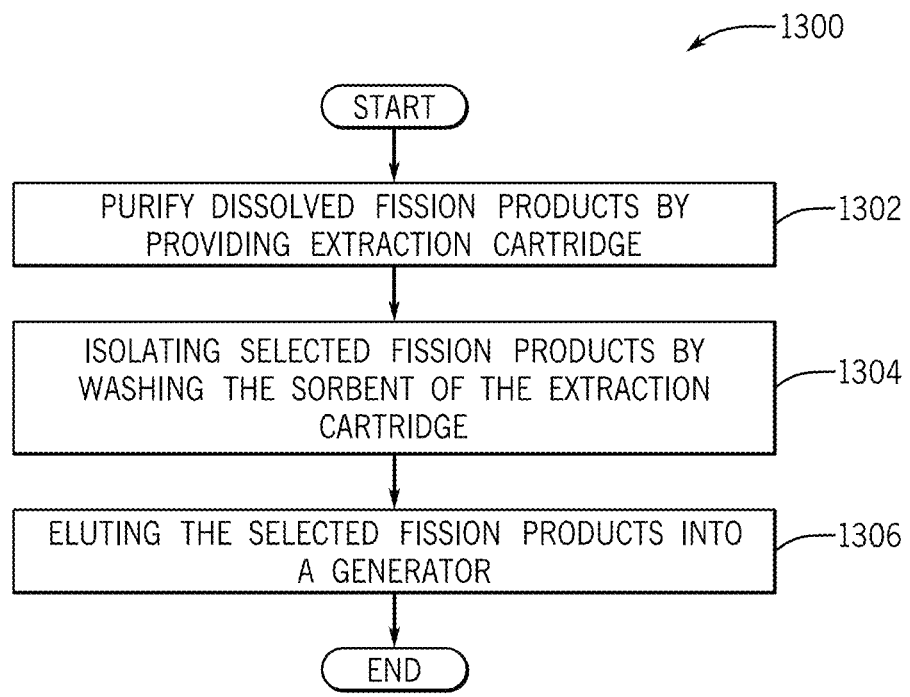
FIG. 13 illustrates a flow diagram of an example method for purifying extracted fission products.

Turning now to FIG. 13, which illustrates a flow diagram of an example method 1300 for purifying the dissolved fission products from the carboy. Method 1300 may be facilitated by the purification system 118 of FIG. 1. In several embodiments, method 1300 follows method 1200. The steps associated with FIG. 13 may be carried out by components illustrated in FIG. 2, 3, 8, or 9. At step 1302, the fission products dissolved in the carboy may be purified by providing an extraction cartridge configured to receive and absorb the dissolved fission products from the liquid solution of the carboy. The extraction cartridge may be extraction cartridge 218, 318, 804, 904, or 1000. In several embodiments, the extraction cartridge is a SPE cartridge. The extraction cartridge may generally be configured to facilitate column chromatography to isolate selected fission products from unselected fission products based on the need. For example, the extraction cartridge may include a sorbent bed configured to absorb molybdate while exuding other fission product complexes, such as an alumina sorbent or sorbent bed 1010. At step 1306, the selected fission products may be eluted into a generator. The generator may be generator 220, 320, 806, 906, or 1100. This step may be accomplished by washing the extraction cartridge with a solution configured to remove the selected fission products from the sorbent bed.

Figure 14:
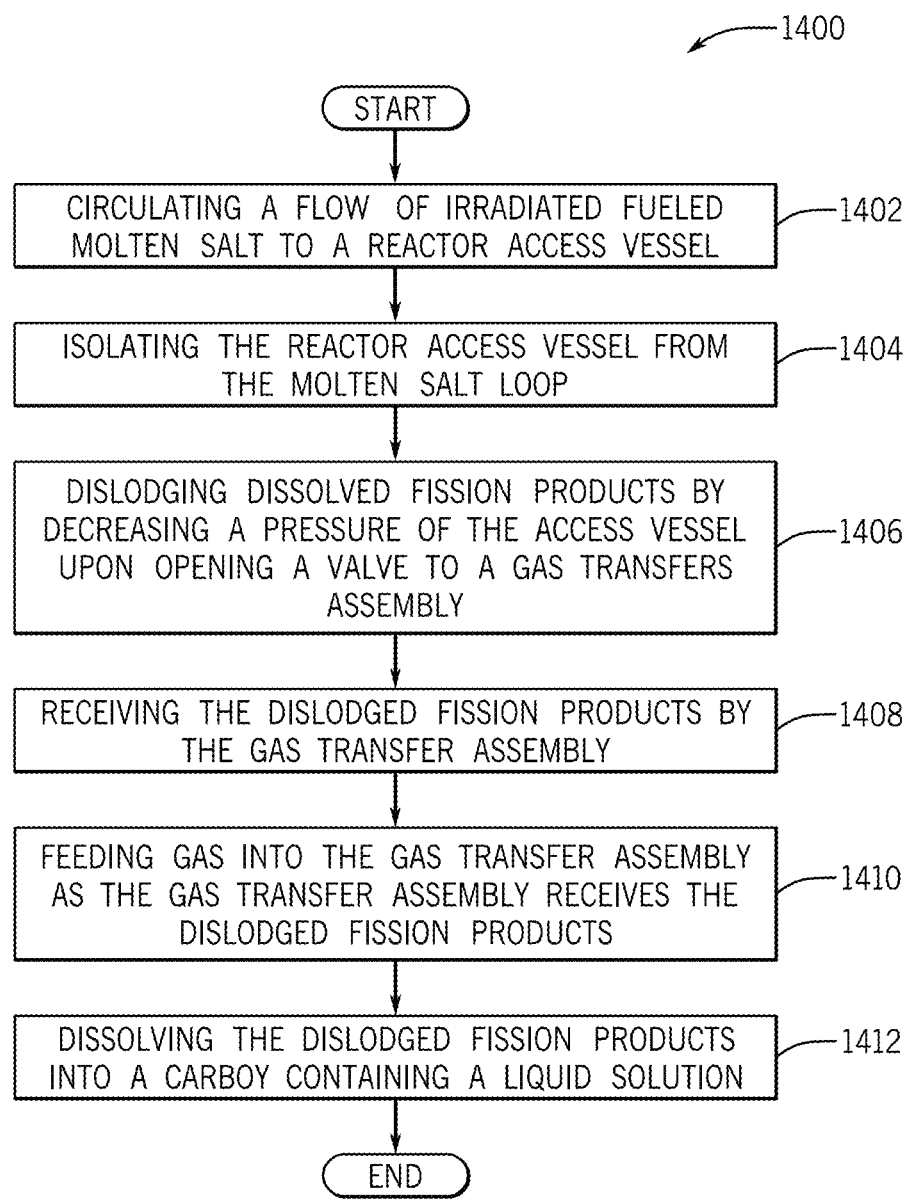
FIG. 14 illustrates a flow diagram of another example method for capturing fission products.

Turning now to FIG. 14, which illustrates a flow diagram of an example method 1400 for extracting fission products from irradiated fueled molten salt of a molten salt reactor system. Notably, the present invention contemplates methods of extracting fission products without sparging the vessel, generally by reducing the pressure of the vessel causing dissolved fission products to be more environmentally stable in the gaseous phase of the vessel. Additionally, method 1400 may be followed by method 1300, in order to isolate or purify selected fission products captured by method 1400. At step 1402, a flow of irradiated fueled molten salt is circulated through a reactor access vessel, such as vessel 702. The flow of irradiated fueled molten salt may be circulated by molten salt inlet pipe 724 and molten salt outlet pipe 726. The irradiated fueled molten salt may contain fission products following nuclear fission. At step 1404, the reactor access vessel may be isolated from the molten salt loop of the molten salt reactor system. For example, the reactor access vessel may be that of vessel 702 in FIG. 7 and may be isolated by activating bypass 734 through valve 736 and valve 738. In this way, the MSR system does not require shutdown or even a slowdown of power production to extract fission products produced therein. At step 1040, the vessel may include irradiated fueled molten salt with dissolved fission products therein. At step 1406, the dissolved fission products may be dislodged from the irradiated fueled molten salt by decreasing a pressure of the access vessel upon opening a valve to a gas transfer assembly. The gas transfer assembly and corresponding valve may be the gas transfer assembly 712 and valve 728 of FIG. 7. By opening such a valve, the volume of the gas transfer assembly is exposed to the volume of the vessel, effectively increasing the volume of the vessel, consequently reducing the pressure of the vessel, and causing dislodgement of dissolved gaseous fission products. At step 1408, the dislodged fission products may be received by the gas transfer assembly, such as gas transfer assembly 712. Following dislodgement, the fission products will be in the gaseous phase (e.g., molybdenum hexafluoride and other fission products in a fluoride complexes), consequently they will ascend up into the gas transfer assembly. At step 1408, a gas is fed into the gas transfer assembly as the gas transfer assembly receives the dislodged fission products to direct such fission products to the carboy. Similarly, gas transfer assembly 712 may be involved in this step. Additionally, a second gas conduit 710 may be configured to feed the gas into gas transfer assembly 712 to push or force the dislodged fission products in the direction of the carboy. In some embodiments, the gas emitted by the second gas conduit 710 may include a halogenating agent to volatilize any fission products deposited onto a surface of the gas transfer assembly 712. At step 412, the dislodged fission products are dissolved in a liquid solution of the carboy, such as carboy 714. In several embodiments, the carboy includes a solution configured to dissolve the fission products placed therein. For example, the carboy may contain an aqueous solution with sodium hydroxide, such that as molybdenum hexafluoride contacts the solution it reacts and produces sodium molybdate, sodium fluoride, and water.

Though Mo-99 is generally used as an example fission product within the disclosure, the systems and methods as described herein may be utilized to isolate and process any fission product created in a molten salt reactor system. The table below shows a non-exhaustive list of potential fission products that may be isolated and processed using the disclosed systems and methods:

| Isotope | Medical Applications | Radiation | Half-life |
|---|---|---|---|
| Hydrogen-3 | Many | Beta | 12.32 years |
| Nitrogen-13 | Myocardial blood flow imaging | PET | 9.965 |
| Carbon-14 | Studying abnormalities that underline diabetes, gout, anemia and acromegaly; insufflation gas for procedure like endoscopies; and | Beta/Gamma | 5700 years |

-continued

| Isotope | Medical Applications | Radiation | Half-life | |
|---|---|---|---|---|
| | more | | | |
| Oxygen-15 | Blood flow imaging | PET | 122.24 | seconds |
| Fluorine-18 | Used to diagnose cancer, heart disease, and epilepsy | PET (positron) | 109.77 | minutes |
| Gallium-67 | Imaging of tumors and infections | Gamma | 3.2617 | days |
| Gallium-68 | Imaging of tumors and infections | Positron | 68 | minutes |
| Selenium-75 | Many | Gamma | 119.78 | days |
| Krypton-81m | Pulmonary imaging | Gamma | 13.1 | seconds |
| Strontium-89 | Bone metastases | Beta | 50.563 | days |
| Yttrium-90 | Treatment of arthritis | Beta | 64.053 | hours |
| Technetium-99m | Many | Gamma | 6.0067 | hours |
| Molybdenum-99 | Multiple | Beta | 65.976 | hours |
| Indium-111 | Many | Gamma | 2.8047 | days |
| Iodine-123 | Many | Gamma | 13.22 | hours |
| Iodine-125 | Clot imaging | Gamma | 59.5 | days |
| Iodine-131 | Many | Beta/Gamma | 8.025 | days |
| Xenon-133 | Many | Gamma | 2.198 | days |
| Samarium-153 | Bone metastases | Beta/Gamma | 46.284 | hours |
| Erbium-169 | Treatment of arthritis | Beta | 9.392 | days |
| Radium-223 | Bond cancer therapy | Alpha | 11.43 | days |

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A fission product extraction system comprising:
    a vessel fluidly connected to a molten salt loop of a molten salt reactor system, wherein the vessel is configured to receive a flow of fueled molten salt comprising dissolved fission products from the molten salt loop; and
    an extraction assembly fluidly coupled to the vessel and comprising
        a first gas conduit configured to introduce inert gas into the vessel and dislodge the dissolved fission products from the fueled molten salt;
        a gas transfer assembly configured to receive the dislodged fission products from the vessel,
        a second gas conduit fluidly connected to the gas transfer assembly, and configured to feed a gas into the gas transfer assembly and move the dislodged fission products therethrough, and
        a carboy fluidly connected to the gas transfer assembly and configured to receive the dislodged fission products and dissolve the dislodged fission products into a liquid solution contained within the carboy; and
    wherein the fission products are dislodged from the fueled molten salt in a gaseous phase by diffusion through agitation caused by the inert gas contacting the fueled molten salt, wherein the gas transfer assembly includes a gas outlet positioned on a top side of the vessel, and wherein the gaseous phase fission products ascend into the gas outlet upon dislodgment.

2. The fission product extraction system of claim 1, further comprising a purification system comprising
    an extraction cartridge configured to receive the liquid solution containing the dissolved fission products from the carboy, wherein the extraction cartridge is operable to absorb fission products from the liquid solution;
    wherein fission products are retained in a sorbent of the extraction cartridge as the dissolved fission products in the liquid solution from the carboy are passed through the extraction cartridge; and
    wherein the retained fission products are eluted from the sorbent into a generator configured to store the fission products.

3. The fission product extraction system of claim 2, wherein the extraction cartridge is operable to selectively isolate fission products from one another by configuring the sorbent to absorb the selected fission products and elute other fission products of the fission products.

4. The fission product extraction system of claim 2, wherein the extraction cartridge and/or the carboy are removable while containing the dislodged fission products from the fission product extraction system for offsite processing.

5. The fission product extraction system of claim 3, wherein the extraction cartridge is configured to be fluidly connected to the generator and a waste container, wherein the extraction system includes piping and at least one valve to selectively direct fission products from the extraction cartridge to the generator or the waste container.

6. The fission product extraction system of claim 1, wherein the first gas conduit includes a porous tube extending into an internal volume of the vessel and configured to feed the inert gas into the vessel through a plurality of pores of the porous tube.

7. The fission product extraction system of claim 1, wherein the first gas conduit is configured to feed the inert gas about an internal periphery of the vessel.

8. The fission product extraction system of claim 7, wherein the first gas conduit includes a porous toroidal tube positioned at a lower section of the vessel and configured to feed the inert gas into the vessel through a plurality of pores of the porous toroidal tube.

9. The fission product extraction system of claim 1, wherein the first gas conduit includes a support rod vertically extending from a bottom side of the vessel into an internal volume of the vessel, wherein the support rod includes at least one horizontally extending porous blade configured to feed the inert gas into the vessel through a plurality of pores of the at least one porous blade as the at least one porous blade spins about the support rod.

10. The fission product extraction system of claim 2, wherein the extraction cartridge is a Solid Phase Extraction (SPE) cartridge including at least one alumina sorbent.

11. The fission product extraction system of claim 1, wherein the second gas conduit is configured to feed the gas throughout piping of the gas transfer assembly and wherein the second gas conduit is configured to feed the gas in the direction of the carboy to facilitate receipt of the dislodged fission products by the carboy.

12. The fission product extraction system of claim 1, wherein the gas includes a halogenating agent operable to react with precipitated fission products deposited on piping of the transfer assembly.

13. The fission product extraction system of claim 1, wherein the gas transfer assembly includes at least one heat wrap configured to heat a surface of piping of the gas transfer assembly.

14. The fission product extraction system of claim 1, wherein the dissolved fission products comprise molybdenum.

15. The fission product extraction system of claim 1, wherein the inert gas comprises helium gas.

16. The fission product extraction system of claim 12, wherein the halogenating agent comprises nitrogen trifluoride.

17. A system comprising:
a fuel salt system configured to circulate an irradiated fueled molten salt comprising dissolved fission products through a molten salt loop of a molten salt reactor system including an access vessel, a reactor, a heat exchanger; and
an extraction system fluidly coupled to the access vessel along the molten salt loop and comprising
the access vessel fluidly connected to the molten salt loop of the molten salt reactor system and configured receive a flow of irradiated fueled molten salt from the reactor of molten salt reactor system following nuclear fission;
a first gas conduit fluidly connected to the access vessel and configured to sparge and dislodge the dissolved fission products from the irradiated fueled molten salt; and
a gas transfer assembly fluidly connected to the access vessel and configured to receive the dislodged fission products and direct the sparged fission products to a carboy;
a second gas conduit fluidically connected to the gas transfer assembly, and configured to feed a gas into the gas transfer assembly and move the dislodged fission products therethrough;
wherein the carboy is fluidly connected to the gas transfer assembly and configured to receive the sparged fission products and dissolve the sparged fission products into a liquid solution contained within the carboy; and
wherein the fission products are dislodged from the irradiated fueled molten salt in a gaseous phase by diffusion through agitation caused by an inert gas contacting the irradiated fueled molten salt, wherein the gas transfer assembly includes a gas outlet positioned on a top side of the access vessel, and wherein the gaseous phase fission products ascend into the gas outlet upon dislodgment.

18. The system of claim 17, further comprising a purification system comprising
a Solid Phase Extraction (SPE) cartridge configured to receive the dissolved fission products from the carboy; wherein the SPE cartridge is operable to absorb fission products from the liquid solution;
wherein fission products are retained in a sorbent of the SPE cartridge as the dissolved fission products in the liquid solution from the carboy are passed through the SPE cartridge;
wherein the retained fission produces are eluted from the sorbent into a generator configured to store the concentrated fission products.

19. The system of claim 18, wherein the SPE cartridge receives the dissolved fission products from the carboy by a continuous flow or by batch.

20. The system of claim 1, further comprising a reactor pump fluidly coupled to the vessel operable to facilitate circulation of the fueled molten salt to the vessel.

21. The system of claim 20, further comprising a heat exchanger connected to the molten salt loop and positioned downstream of the reactor pump and the vessel, such that the heat exchanger receives the fueled molten salt following extraction of the dissolved fission products.

22. A method for extracting fission products from irradiated fueled molten salt of a molten salt reactor system comprising:
sparging a reactor access vessel that is fluidly connected to a molten salt loop of the molten salt reactor system with an inert gas by an extraction assembly fluidly coupled to the reactor access vessel;
wherein the reactor access vessel is configured to receive a flow of fueled molten salt comprising dissolved fission products from the molten salt loop;
wherein the extraction assembly comprises a first gas conduit configured to introduce the inert gas into the reactor access vessel;
dislodging dissolved fission products from the irradiated fueled molten salt via the introduction of the inert gas into the reactor access vessel by the first gas conduit by agitation of the irradiated fueled molten salt by the inert gas;
receiving the dislodged fission products from the irradiated fueled molten salt by a gas transfer assembly of the extraction assembly fluidly connected to the reactor access vessel;
feeding a gas into the gas transfer assembly as the gas transfer assembly receives the dislodged fission products; and
wherein the extraction assembly further comprises a second gas conduit fluidly connected to the gas transfer assembly, and configured to feed the gas into the gas transfer assembly and move the dislodged fission products therethrough;
dissolving the dislodged fission products into a liquid solution in a carboy of the extraction assembly fluidly connected to the gas transfer assembly and configured to receive the dislodged fission products; and
wherein the dissolved fission products are dislodged from the irradiated fueled molten salt in a gaseous phase by diffusion through agitation caused by the inert gas contacting the irradiated fueled molten salt, wherein the gas transfer assembly includes a gas outlet positioned on a top side of the reactor access vessel, and wherein the gaseous phase fission products ascent into the gas outlet upon dislodgement.

23. The method of claim 22, further comprising:
purifying the dissolved fission products by providing an extraction cartridge configured to receive and absorb the dissolved fission products from the liquid solution of the carboy;
isolating selected fission products by washing a sorbent of the extraction cartridge;
eluting the selected fission products from the sorbent into a generator.

24. The method of claim 23, further comprising concentrating the selected fission products by continually passing the liquid solution of the carboy through the extraction cartridge.

25. The method of claim 22, wherein the fission products comprise molybdenum.

26. The method of claim 22, further comprising circulating the irradiated fueled molten salt through a reactor of the molten salt reactor system causing fission reactions.

27. The method of claim 22, further comprising circulating the irradiated fueled molten salt through a heat exchanger following removal of the dissolved fission products.

28. The method of claim 22, wherein the inert gas comprises helium gas and wherein the gas comprises nitrogen trifluoride.

29. A fission product extraction system comprising:
a vessel fluidly connected to a molten salt loop of a molten salt reactor system, wherein the vessel is configured to receive a flow of fueled molten salt comprising dissolved fission products from the molten salt loop;
an extraction assembly fluidly coupled to the vessel and comprising
  a first gas conduit configured to introduce inert gas into the vessel and dislodge the dissolved fission products from the fueled molten salt;
  a gas transfer assembly configured to receive the dislodged fission products from the vessel,
  a second gas conduit fluidly connected to the gas transfer assembly, and configured to feed a gas into the gas transfer assembly and move the dislodged fission products therethrough, and
  a carboy fluidly connected to the gas transfer assembly and configured to receive the dislodged fission products and dissolve the dislodged fission products into a liquid solution contained within the carboy; and
a purification system comprising
  an extraction cartridge configured to receive the liquid solution containing the dissolved fission products from the carboy, wherein the extraction cartridge is operable to absorb fission products from the liquid solution;
  wherein fission products are retained in a sorbent of the extraction cartridge as the dissolved fission products in the liquid solution from the carboy are passed through the extraction cartridge; and
  wherein the retained fission products are eluted from the sorbent into a generator configured to store the fission products.

30. The fission product extraction system of claim 29, wherein the extraction cartridge is operable to selectively isolate fission products from one another by configuring the sorbent to absorb the selected fission products and elute other fission products of the fission products.

31. The fission product extraction system of claim 29, wherein the extraction cartridge and/or the carboy are removable while containing the dislodged fission products from the fission product extraction system for offsite processing.

32. The fission product extraction system of claim 30, wherein the extraction cartridge is configured to be fluidly connected to the generator and a waste container, wherein the extraction system includes piping and at least one valve to selectively direct fission products from the extraction cartridge to the generator or the waste container.

33. The fission product extraction system of claim 29, wherein the extraction cartridge is a Solid Phase Extraction (SPE) cartridge including at least one alumina sorbent.

* * * * *